United States Patent
Lidar et al.

(10) Patent No.: US 10,296,352 B2
(45) Date of Patent: May 21, 2019

(54) NESTED QUANTUM ANNEALING CORRECTION

(71) Applicant: UNIVERSITY OF SOUTHERN CALIFORNIA, Los Angeles, CA (US)

(72) Inventors: Daniel Lidar, Los Angeles, CA (US); Tameem Albash, Los Angeles, CA (US); Walter Vinci, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 15/624,145

(22) Filed: Jun. 15, 2017

(65) Prior Publication Data

US 2017/0364362 A1 Dec. 21, 2017

Related U.S. Application Data

(60) Provisional application No. 62/350,618, filed on Jun. 15, 2016.

(51) Int. Cl.
*G06F 9/38* (2018.01)
*G06F 9/30* (2018.01)
*G06N 10/00* (2019.01)

(52) U.S. Cl.
CPC .......... *G06F 9/3861* (2013.01); *G06F 9/3016* (2013.01); *G06N 10/00* (2019.01)

(58) Field of Classification Search
CPC .... G06N 99/002; G06N 99/005; G06N 7/005; G06N 3/006; G06N 3/12; G06N 10/00; G06N 20/00; G06N 3/0454; G06N 99/00
See application file for complete search history.

(56) References Cited

U.S. PATENT DOCUMENTS

| | | | |
|---|---|---|---|
| 2006/0225165 A1* | 10/2006 | Maassen van den Brink | G06N 99/002 257/9 |
| 2014/0223224 A1* | 8/2014 | Berkley | G06F 11/0724 714/10 |
| 2015/0317558 A1* | 11/2015 | Adachi | G06N 3/04 706/19 |

* cited by examiner

*Primary Examiner* — Tony Tran
(74) *Attorney, Agent, or Firm* — Nixon Peabody LLP

(57) ABSTRACT

Systems and methods of processing using a quantum processor are described. A method includes obtaining a problem Hamiltonian and defining a nested Hamiltonian with a plurality of logical qubits by embedding a logical $K_N$ representing the problem Hamiltonian into a larger $K_{C \times N}$, where N represents a number of the logical qubits and C represents a nesting level defining the amount of hardware resources for the nest Hamiltonian. The method also includes encoding the nested Hamiltonian into the plurality of physical qubits of the quantum processor; and performing a quantum annealing process with the quantum processor after the encoding.

8 Claims, 28 Drawing Sheets

NESTED QUANTUM ANNEALING CORRECTION

CROSS-REFERENCE TO RELATED APPLICATIONS

This application claims priority to and the benefit of U.S. Provisional Patent Application No. 62/350,618, entitled "NESTED QUANTUM ANNEALING CORRECTION" and filed Jun. 15, 2016, the contents of which are herein incorporated by reference in their entirety.

STATEMENT REGARDING FEDERALLY FUNDED RESEARCH

This invention was made with government support under grant INSPIRE-1551064 awarded by the National Science Foundation, and grants W911NF-11-1-0268, W911NF-15-1-0582, and W911NF-12-1-0523 awarded by the Army Research Office. The government has certain rights in the invention.

FIELD OF THE INVENTION

The present invention relates to an error-correcting scheme for quantum annealing that allows for the encoding of a logical qubit into an arbitrarily large number of physical qubits.

BACKGROUND

Quantum annealing (QA) attempts to exploit quantum fluctuations to solve computational problems faster than it is possible with classical computers. As an approach designed to solve optimization problems, QA is a special case of adiabatic quantum computation (AQC), a universal model of quantum computing. In AQC, a system is designed to follow the instantaneous ground state of a time-dependent Hamiltonian whose final ground state encodes the solution to the problem of interest. This results in a certain amount of stability, since the system can thermally relax to the ground state after an error, as well as resilience to errors, since the presence of a finite energy gap suppresses thermal and dynamical excitations.

Despite this inherent robustness to certain forms of noise, AQC requires error-correction to ensure scalability, just like any other form of quantum information processing. Various error correction proposals for AQC and QA have been made, but an accuracy-threshold theorem for AQC is not yet known, unlike in the circuit model. A direct AQC simulation of a fault-tolerant quantum circuit leads to many-body (high-weight) operators that are difficult to implement or to a myriad of other problems. Nevertheless, a scalable method to reduce the effective temperature would go a long way towards approaching the ideal of closed-system AQC, where quantum speedups are known to be possible.

SUMMARY

According to an aspect of an exemplary embodiment, a method of nested error correction for quantum annealing, to improve the performance of quantum annealers includes defining a nested Hamiltonian by embedding a logical $K_N$ into a larger $K_{C \times N}$, where N represents a number of logical qubits and C represents a nesting level and controls an amount of hardware resources used to represent a logical problem, implementing the nested Hamiltonian on a quantum annealing hardware, with a lower-degree qubit connectivity graph, and measuring a plurality of physical qubits.

According to another exemplary embodiment, the method further includes recovering a logical state using a decoding procedure.

According to another exemplary embodiment, the implementing further comprises minor embedding which includes replacing each qubit in the nested Hamiltonian by a ferromagnetically coupled chain of qubits, such that all couplings in the nested Hamiltonian are represented by inter-chain couplings.

According to another exemplary embodiment, the decoding procedure is performed over both a length (L) chain of each encoded qubit and C encoded qubits comprising each logical qubit.

According to another exemplary embodiment, a number of physical qubits necessary for the minor embedding of the $K_{C \times N}$ is $N_{C,Phys} = CNL \sim C^2 N^2$.

According to another exemplary embodiment, the hardware resources comprise at least one of qubits, couplers and local fields.

According to another exemplary embodiment, each logical cubit $i$ ($i=1, \ldots, N$) is represented by a C-tuple of encoded qubits $(i, c)$, with $c=1, \ldots, C$.

According to another exemplary embodiment, the hardware resources comprise nested couplers $\tilde{J}_{(i,c)(j,c')}$ and local fields $\tilde{h}_{(i,c)}$ where $$\tilde{J}_{(i,c),(j,c')} = J_{ij}, \forall c, c', i \neq j,$$

$$\tilde{h}_{(i,c)} = Ch_i, \forall c, i,$$

$$\tilde{J}_{(i,c),(i,c')} = -\gamma, \forall c \neq c'.$$

According to another exemplary embodiment, a processing system includes a digital computer having a digital processor and a memory having stored thereon instructions for causing the digital processor to: obtain a problem Hamiltonian and define a nested Hamiltonian with a plurality of logical qubits by embedding a logical $K_N$ representing the problem Hamiltonian into a larger $K_{C \times N}$, where N represents a number of the logical qubits and C represents a nesting level defining the amount of hardware resources for the nest Hamiltonian. The processing system also includes an analog computer coupled to the digital computer, the analog computer including a quantum processor and configured for encoding the nested Hamiltonian into a plurality of physical qubits of the quantum processor, and performing a quantum annealing process with the quantum processor after the encoding.

In another exemplary embodiment, the analog computer is configured for measuring the plurality of physical qubits, and where the instructions further comprise instructions for causing the digital processor to recover a logical state of each of the plurality qubits using a decoding procedure.

In another exemplary embodiment, the encoding further includes performing a minor embedding process comprising replacing each of plurality of logical qubits in the nested Hamiltonian by a ferromagnetically coupled chain of qubits, such that all couplings in the nested Hamiltonian are represented by inter-chain couplings.

In another exemplary embodiment, a number of physical qubits necessary for the minor embedding of the $K_{C \times N}$ is $N_{C,Phys} = CNL \sim C^2 N^2$.

In another exemplary embodiment, the decoding procedure is performed over both a length (L) chain of each encoded qubit and C encoded qubits comprising each logical qubit.

In another exemplary embodiment, the hardware resources include at least one of qubits, couplers, and local fields.

In another exemplary embodiment, each logical cubit i (i=1, . . . , N) is represented by a C-tuple of encoded qubits (i, c), with c=1, . . . , C.

In another exemplary embodiment, the hardware resources include nested couplers $\tilde{J}_{(i,c)(j,c')}$ and local fields $\tilde{h}_{(i,c)}$ where:

$\tilde{J}_{(i,c),(j,c')} = J_{ij}, \forall c,c', i \neq j,$ $\tilde{h}_{(i,c)} = Ch_i, \forall c,i,$ $\tilde{J}_{(i,c),(i,c')} = -\gamma, \forall c \neq c'.$ Additional embodiments of the invention are described in the description and figures provided below.

DETAILED DESCRIPTION

Figure 1A:
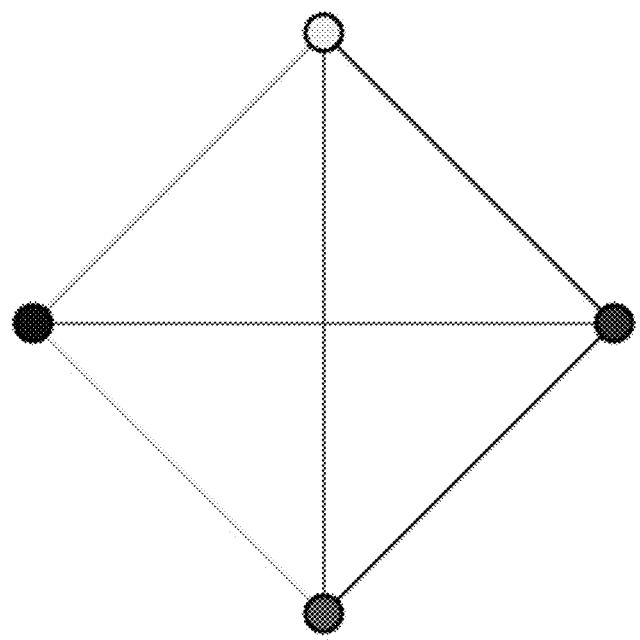
FIGS. 1A-1D shows an illustration of the nesting scheme of the various embodiments.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Motivated by the availability of commercial QA devices featuring hundreds of qubits, the various embodiments are directed to methods for error correction for QA. There is a consensus that these devices are significantly and adversely affected by decoherence, noise, and control errors, which makes them particularly interesting for the study of tailored, practical error correction techniques. Such techniques, known as quantum annealing correction (QAC) schemes, have already been experimentally shown to significantly improve the performance of quantum annealers, and theoretically analyzed using a mean-field approach. However, these QAC schemes are not easily generalizable to arbitrary optimization problems since they induce an encoded graph that is typically of a lower degree than the qubit-connectivity graph of the physical device. Moreover, they typically impose a fixed code distance, which limits their efficacy.

To overcome these limitations, the present disclosure presents a family of error-correcting codes for QA, based on a "nesting" scheme, that has the following properties: (1) it can handle arbitrary Ising-model optimization problem, (2) it can be implemented on present-day QA hardware, and (3) it is capable of an effective temperature reduction controlled by the code distance. The "nested quantum annealing correction" (NQAC) scheme of the various embodiments thus provides a very general and practical tool for error correction in quantum optimization.

In QA, the system undergoes an evolution governed by the following time-dependent, transverse-field Ising Hamiltonian:

$$H(t)=A(t)H_X+B(t)H_P, t\in[0,t_f], \quad (1)$$

with respectively monotonically decreasing and increasing "annealing schedules" $A(t)$ and $B(t)$. The "driver Hamiltonian" $H_X=\Sigma_i \sigma_i$ is a transverse field whose amplitude controls the tunneling rate. The solution to an optimization problem of interest is encoded in the ground state of the Ising problem Hamiltonian $H_P$, with $$H_P = \sum_{i\in V} h_i \sigma_i^z + \sum_{(i,j)\in \varepsilon} J_{ij} \sigma_i^z \sigma_j^z, \quad (2)$$

where the sums run over the weighted vertices $v$ edges $\varepsilon$ of a graph $G=(v, \varepsilon)$, and $\sigma_i^{x,z}$ denote the Pauli operators acting on qubit i. Available QA devices use an array of superconducting flux qubits to physically realize the system described in Eqs. (1) and (2) on a fixed "Chimera" graph (see FIG. 1) with programmable local fields $\{h_i\}$, couplings $\{J_{ij}\}$, and annealing time $t_f$.

Figure 1B:
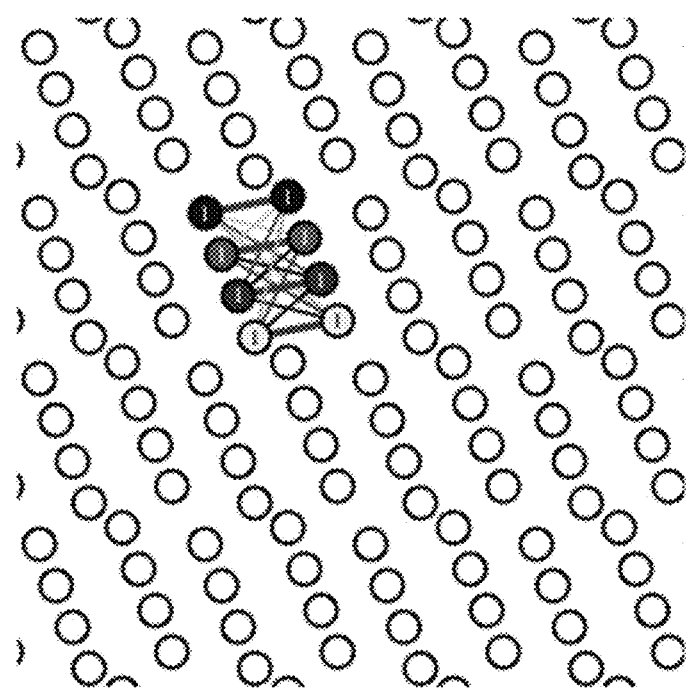
Figure 1C:
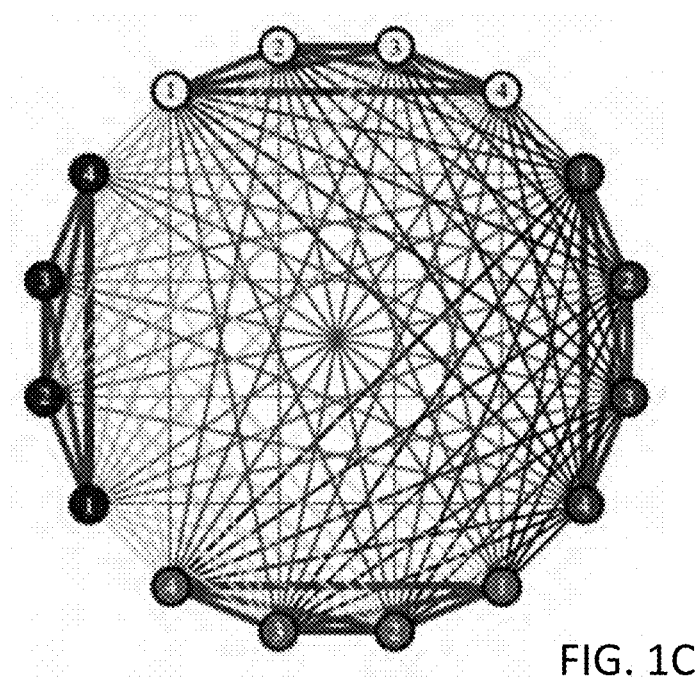
Figure 1D:
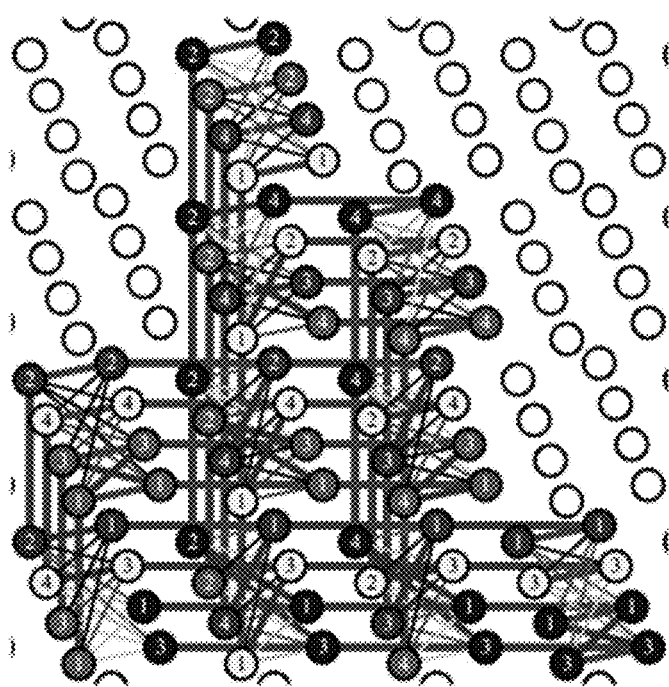

FIGS. 1A-1D shows an illustration of the nesting scheme. In FIGS. 1A and 1C, a C-degree nested graph is constructed by embedding a $K_N$ into a $K_{C\times N}$, with N=4 and C=1 (FIG. 1A) and C=4 (FIG. 1C). Red, thick couplers are energy penalties defined on the nested graph between the (i, c) nested copies of each logical qubit i. FIGS. 1B and 1D show the nested graphs after ME on the Chimera graph. The thicker couplers correspond to the ferromagnetic chains introduced in the process.

The adiabatic theorem for closed systems guarantees that if the system is initialized in the ground state of $H(0)=A(0)H_X$, a sufficiently slow evolution relative to the inverse minimum gap of $H(t)$ will take the system with high probability to the ground state of the final Hamiltonian $H(t_f)=B(t_f)H_P$. Dynamical errors then arise due to diabatic transitions, but they can be made arbitrarily small via boundary cancellation methods that control the smoothness of $A(t)$ and $B(t)$, as long as the adiabatic condition is satisfied. This means that in particular the probability of Landau-Zener transitions is exponentially suppressed, though of course $t_f$ is still controlled by an inverse (cubic) power of the minimum gap. One can assume that the problem of Landau-Zener transitions is addressed by such boundary cancellation methods [though the experiments described below do not include such methods since they could not be implemented with control over the smoothness of A (t) and B (t) and focus here on addressing the errors that occur in open systems. For the latter, specifically a system that is weakly coupled to a thermal environment, the final state is a mixed state $\rho(t_f)$ that is close to the Gibbs state associated with $H(t_f)$ if equilibration is reached throughout the annealing process. In the adiabatic limit the open system QA process is thus better viewed as a Gibbs distribution sampler. The main goal of QAC is to suppress the associated thermal errors and restore the ability of QA to act as a ground state solver. In addition QAC should suppress errors due to noise-driven deviations in the specification of $H_P$.

Error correction is achieved in QAC by mapping the logical Hamiltonian $H(t)$ to an appropriately chosen encoded Hamiltonian $\overline{H}(t)$:

$$\overline{H}(t)A(t)H_X+B(t)\overline{H}_P, t\in[0,t_f] \quad (3)$$

defined over a set of physical qubits N larger than the number of logical qubits $N=|v|$. Note that $\overline{H}_P$ also includes penalty terms, as explained below. The logical ground state of $H_P$ is extracted from the encoded system's state $\overline{\rho}(t_f)$ through an appropriate decoding procedure. A successful error correction scheme should recover the logical ground state with a higher probability than a direct implementation of $H_P$, or than a classical repetition code using the same number of physical qubits $\overline{N}$. Due to practical limitations of current QA devices that prevent the encoding of $H_X$, only $H_P$ is encoded in QAC. In the future it may be possible to circumvent this limitation using coupling to ancilla qubits. At present it results in a tradeoff since it requires us to optimize the penalty strength, and may also result in a need to optimize the nesting degree, since without encoding $H_X$ the minimum gap may shrink relative to the unencoded problem.

In order to allow for the most general N-variable Ising optimization problem, a methodology in accordance with the various embodiments defines an encoding procedure for problem Hamiltonians $H_P$ supported on a complete graph $K_N$. The first step of the construction involves a "nested" Hamiltonian $\tilde{H}_P$ that is defined by embedding the logical $K_N$ into a larger $K_{C\times N}$. The integer C is the "nesting degree" and controls the amount of hardware resources (qubits, couplers, and local fields) used to represent the logical problem. $\tilde{H}_P$ is constructed as follows. Each logical qubit i (i=1, . . . , N) is represented by a C-tuple of encoded qubits (i, c), with c=1, . . . , C. The "nested" couplers $\tilde{J}_{(i,c),(j,c')}$ and local fields $\tilde{h}_{(i,c)}$ are then defined as follows:

$$\tilde{J}_{(i,c),(j,c')}=J_{ij}, \forall c,c', i\neq j, \quad (4a)$$

$$\tilde{h}_{(i,c)}=Ch_i, \forall c,i, \quad (4b)$$

$$\tilde{J}_{(i,c),(i,c')}=-\gamma, \forall c\neq c'. \quad (4c)$$

This construction is illustrated in FIGS. 1A and 1C. Each logical coupling $J_{ij}$ has $C^2$ copies $\tilde{J}_{(i,c),(j,c')}$, thus boosting the energy scale at the encoded level by a factor of $C^2$. Each local field $h_i$ has C copies $\tilde{h}_{(i,c)}$; the factor C in Eq. (4b) ensures that the energy boost is equalized with the couplers. For each logical qubit i, there are $C(C-1)/2$ ferromagnetic couplings $\tilde{J}_{(i,c),(j,c')}$ of strength $\gamma>0$ (to be optimized), representing energy penalties that promote agreement among the C encoded qubits, i.e., that bind the C-tuple as a single logical qubit i.

The second step of the construction is to implement the fully connected problem $\tilde{H}_P$ on given QA hardware, with a lower-degree qubit connectivity graph. This requires a minor embedding (ME). The procedure involves replacing each qubit in $\tilde{H}_P$ by a ferromagnetically coupled chain of qubits, such that all couplings in $\tilde{H}_P$ are represented by inter-chain couplings. The intra-chain coupling represents another energy penalty that forces the chain qubits to behave as a single logical qubit. The physical Hamiltonian obtained after this ME step is the final encoded Hamiltonian $\overline{H}_P$. One can minor-embed a $K_{C\times N}$ nested graph representing each qubit (i, c) as a physical chain of length $$L=\left[\frac{CN}{4}\right]+1$$

on the Chimera graph. This is illustrated in FIGS. 1B and 1D. The number of physical qubits necessary for a ME of a $K_{C\times N}$ on Chimera is therefore $N_{phys}=CNL \sim C^2N^2/4$. More generally, the minor embeddings of a $K_{C\times N}$ requires a number of physical qubits that grows with $C^2N^2$, with the specific value of the proportionality constant depending on the specific properties of the quantum hardware. For example, ¼ for Chimera.

At the end of a QA run implementing the encoded Hamiltonian $\bar{H}_P$ and a measurement of the physical qubits, a decoding procedure must be employed to recover the logical state. For the sake of simplicity one need only consider majority vote decoding over both the length-L chain of each encoded qubit (i, c) and the C encoded qubits comprising each logical qubit i (decoding over the length-L chain first, then over the C encoded qubits, does not affect performance; see Partition Function Calculation in Supplemental Information (SI). The encoded and logical qubits can thus be viewed as forming repetition codes with, respectively, distance L and C. Other decoding strategies are possible wherein the encoded or logical qubits do not have this simple interpretation; e.g., energy minimization decoding, which tends to outperform majority voting. In the unlikely event of a tie, one can assign a random value of +1 or −1 to the logical qubit.

Free Energy

Using a mean-field analysis that reduces the model to an equivalent classical one by employing the Suzuki-Trotter formula, one can compute the partition function associated with the nested Hamiltonian $A(t)H_x + B(t)\tilde{H}_P$ for the case with uniform antiferromagnetic couplings. This leads to the following free energy density in the low temperature and thermodynamic limits (see Free Energy in SI):

$$\beta F = C^2 \beta (\sqrt{[A(t)/C]^2 + [2\gamma B(t)m]^2} - \gamma B(t)m^2) \quad (5)$$

where m is the mean-field magnetization. There are two key noteworthy aspects of this result. First, the driver term is rescaled as $A(t) \to C^{-1}A(t)$. This shifts the crossing between the A and B annealing schedules to an earlier point in the evolution and is related to the fact that QAC encodes only the problem Hamiltonian term proportional to B(t). Consequently the quantum critical point is moved to earlier in the evolution, which benefits QAC since the effective energy scale at this new point is higher. Second, the inverse temperature is rescaled as $\beta \to C^2\beta$. This corresponds to an effective temperature reduction by $C^2$, a manifestly beneficial effect. The same conclusion, of a lower effective temperature, is reached by studying the numerically computed success probability associated with thermal distributions (see SI Sec. III). This prediction is born out by the experimental results, though it is masked to some extent by complications arising from the ME and noise.

Effective Temperature Scaling for Optimization Applications

The important finding above is that the nesting scheme of the various embodiments allows one to increase the energy scale of the problem Hamiltonian implemented in a quantum annealing device. As discussed above, this "energy boost" can be interpreted as an effective reduction in the temperature at which the device operates. Therefore, by implementing NQAC it is then possible to reduce both thermal and control errors. NQAC gives the possibility to use an arbitrarily large amount of physical resources (number of used qubits) to lower effective temperature below an acceptable threshold. This aspect is crucial because although it is possible to scale the size of quantum annealing devices, there are fundamental practical limits that prevent an arbitrary reduction of the physical temperature of a physical system.

The NQAC encoding is defined in terms of a nesting level C that controls the amount of protection against thermal and control errors. C also controls the number of physical qubits $N_{phys}$ used in a nested encoding scales as $N_{phys} \sim C^2$. In the discussion above, it is shown that it is possible to obtain an energy boost $\mu_C$ that scales polynomially with the number of physical qubits used: $\mu_C \sim C^\eta$ ($\eta < 2$). This is equivalent to an effective temperature reduction $T \to T/\mu_C$. This scaling law is demonstrated herein on a D-Wave 2000Q quantum annealer processor featuring 504 active flux-qubits. The size of this processor allowed confirmation of the scaling law up to C=8, with a scaling coefficient $\eta \cong 0.52$. This is illustrated in FIGS. 2A-2C.

Figure 2A:
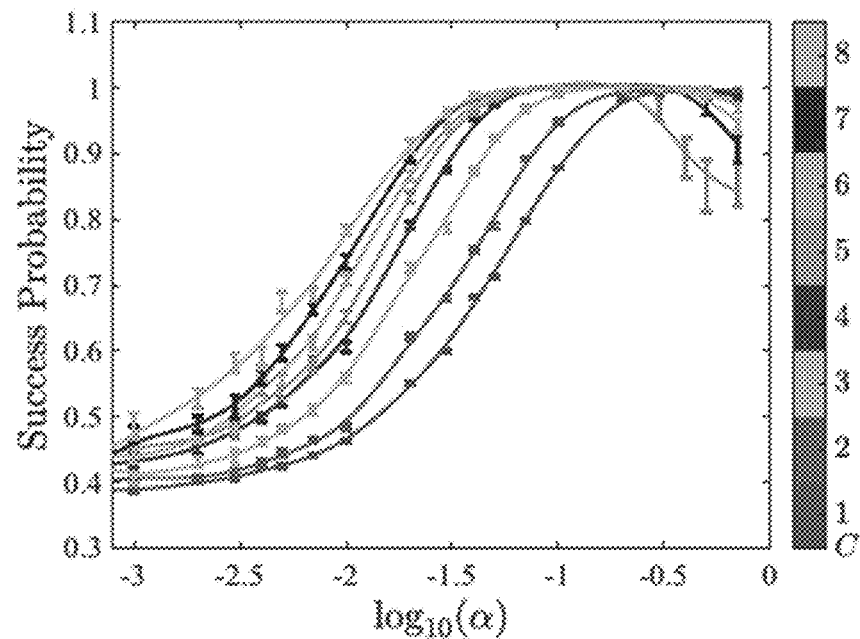
FIGS. 2A-2C show results obtained with a D-Wave 2000Q quantum annealer for the antiferromagnetic $K_4$ illustrating temperature scaling for 8 nesting levels in accordance with the various embodiments.
Figure 2B:
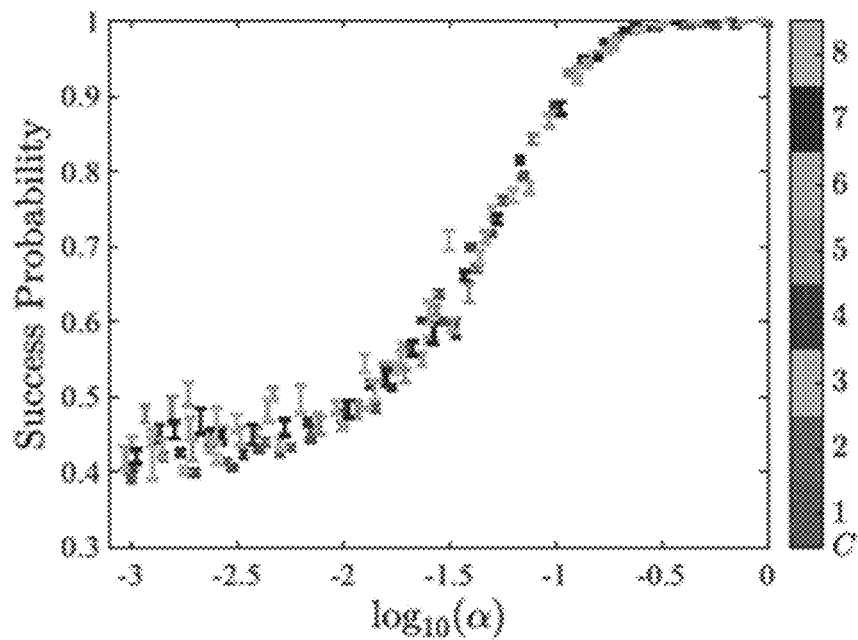
Figure 2C:
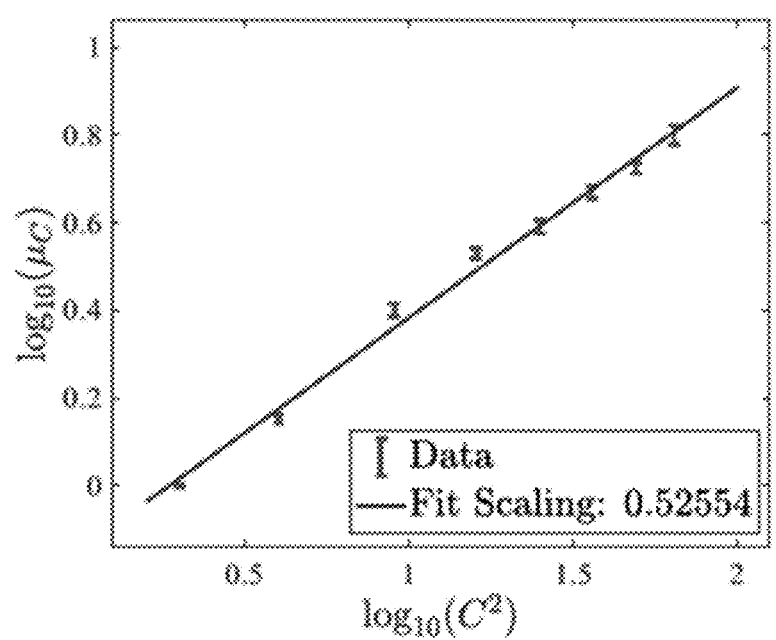

FIG. 2A-2C show results for the antiferromagnetic $K_4$. FIG. 2A shows DW Two success probabilities $P_C(\alpha)$ for 8 nesting levels C. Increasing C generally increases $P_C(\alpha)$ at fixed $\alpha$. FIG. 2B shows rescaled $P_C(\alpha\mu_C)$ data, exhibiting data-collapse. FIG. 2C shows scaling of the energy boost $\mu_C$ vs C. In FIGS. 2A-2C, $N_{phys} \in [8, 288]$.

It is crucial to confirm that the temperature reduction achieved through NQAC is truly scalable, e.g. the scaling law $T_p \sim \mu_C^{-1} \sim C^{-\eta}$ is valid for arbitrarily large values of the nesting level C. Experiments recently confirmed that this is indeed the case for nesting levels up to C=13 by implementing NQAC on the latest-generation D-Wave quantum annealer (D-Wave 2000Q) with 2023 available flux-qubits. The resulting scaling coefficient in this case is $\eta \cong 0.35$ and is demonstrated by the experimental data shown FIGS. 3A-3C.

Figure 3A:
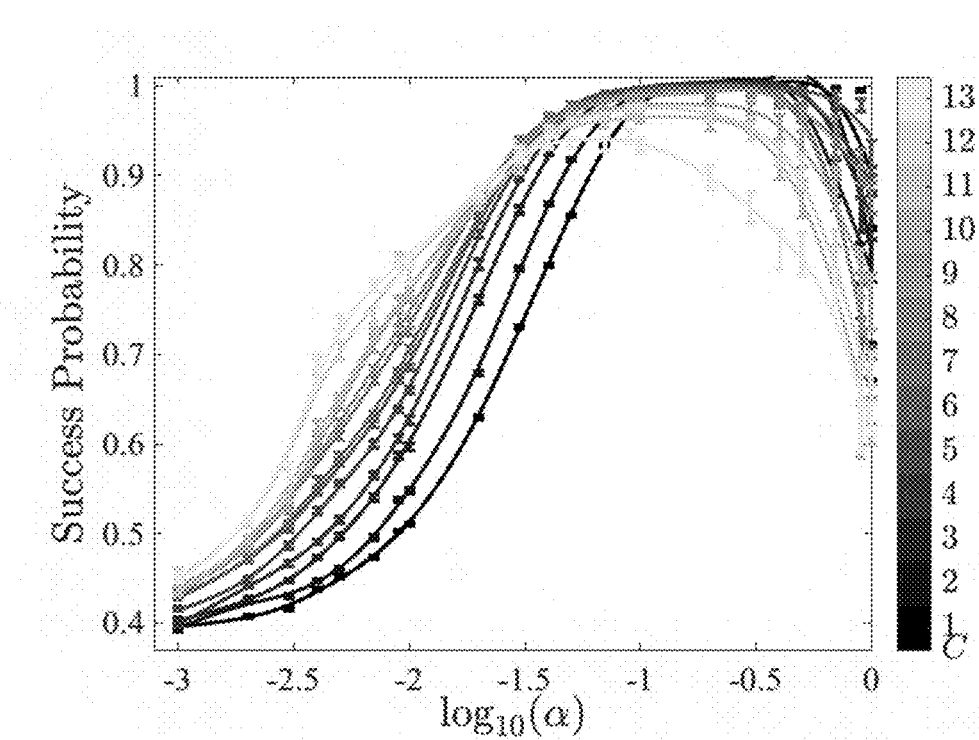
FIG. 3A-3C show results obtained with a D-Wave 2000Q quantum annealer for the antiferromagnetic $K_4$ illustrating temperature scaling for 13 nesting levels in accordance with the various embodiments.
Figure 3B:
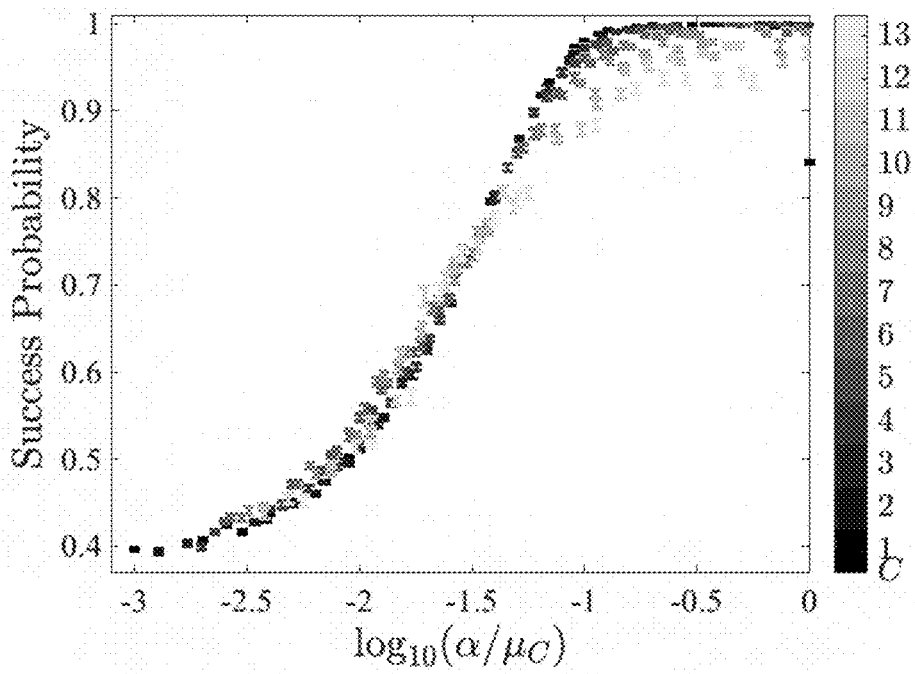
Figure 3C:
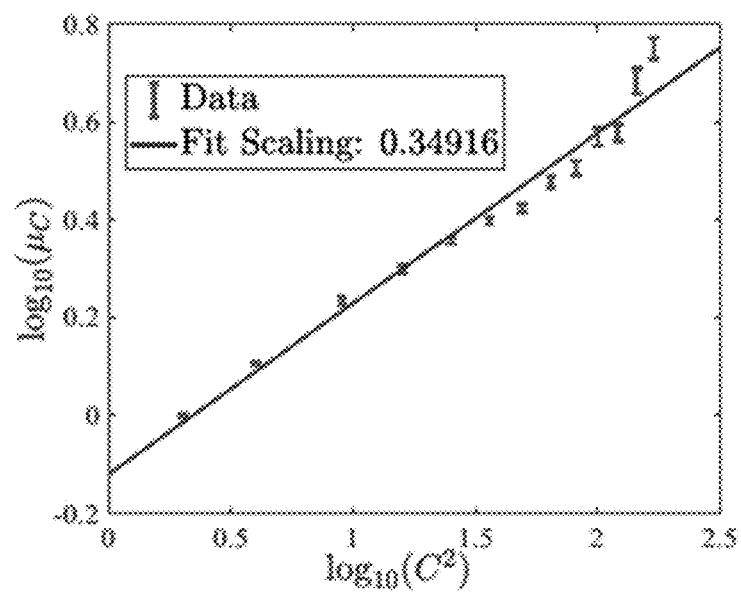

FIGS. 3A-3C show results for the antiferromagnetic $K_4$. In particular, FIG. 3A shows D-Wave 2000Q success probabilities $P_C(\alpha)$ for 13 nesting levels C. Increasing C generally increases $P_C(\alpha)$ at fixed $\alpha$. FIG. 3B shows rescaled $P_C(\alpha\mu_C)$ data, exhibiting data-collapse. FIG. 3C shows scaling of the energy boost $\mu_C$ versus $C^2$. In FIGS. 3A-3C, $N_{phys} \in [8, 728]$.

Effective Temperature Scaling for Machine-Learning Applications

A Boltzmann machine is a generative probabilistic model that can be used for both supervised and non-supervised machine-learning applications. Moreover, it can be used as a building block for deep-belief networks thus playing a role in the booming fields of artificial intelligence and deep-learning. A Boltzmann machine associates a given data point $z \equiv \{z_i\}$ (here represented as a string $z_i = \pm 1$, i=1, ..., N) to an energy function E (z):

$$E(z) = \sum_{i \in V} b_i z_i + \sum_{(i,j) \in \varepsilon} w_{ij} z_i z_j. \quad (6)$$

and a corresponding probability distribution P (z):

$$P(z) = e^{-E(z)}/Z = \sum_z e^{-E(z)}. \quad (7)$$

Notice that the quantity above is defined on the vertices $v$ and edges $\varepsilon$ of some graph $G=(v, \varepsilon)$. A Boltzmann machine is thus also a graphical model. Training a Boltzmann machine consists of finding the values of the weights $b_i$ and $w_{ij}$ such that the probability distribution P(z) generated by the model is as close as possible to the probability distribution of the training set. The training of a Boltzmann machine is achieved by iteratively adjusting the weights of the model according to the following update rules:

$$\delta b_i \sim \langle z_i \rangle_D - \langle z_i \rangle_S, \delta w_{ij} \sim \langle z_i z_j \rangle_D - \langle z_i z_j \rangle_S \quad (8)$$

In (8), the first term in each expression ($\langle z \rangle_D$, term) is the expectation value as measured on the training set and the second term in each expression ($\langle z \rangle_S$ term) is the expectation value as measured using P(z). Computing the second term is known to be computationally hard with classical algorithms, as the computation involves the computation of thermal expectation values of linear and quadratic functions of the variables $z_i$.

The update rules could be computed by a physical device that efficiently sample from a thermal distribution, e.g. it can sample states according to the probability distribution defined above. Recently, the scientific community has begun to use quantum annealers for the above-mentioned sampling task. More precisely, the outcome distribution of states obtained by running a quantum annealing device implementing a problem Hamiltonian as in Eq. 2 is a good approximation of the thermal probability distribution above with:

$$\beta_{eff} h_i = b_i, \beta_{eff} J_{ij} = w_{ij}. \qquad (9)$$

The existence of an effective temperature $T_{eff} = 1/\beta_{eff}$ at which the annealer samples is due to the non-trivial early freezing dynamics that takes place toward the end of the annealing process and should be determined experimentally.

Below is provided evidence that two major limitations of using quantum annealing devices in solving machine-learning problems using Boltzmann machines can be overcome:
a. Limited connectivity. Following the procedure described above, quantum annealers should be used to train Boltzmann machines whose graph matches (a subgraph of) the connectivity graph of the device (see the definition of Chimera graph herein). It is shown herein that it is indeed possible to train a Boltzmann machine on fully connected graphs after a minor embedding procedure as described herein.
b. Limited coupling strength and precision. Quantum annealing devices have technical limitations that impose a largest allowed magnitude for the local fields and couplings: $|h_i| < h_{max}$, $|J_{ij}| < J_{max}$. For a given machine-learning problem, the optimal values of the weights may exceed these maximal values. Indeed, it is expected that $\beta_{eff}$ is reduced with the complexity of the problem, thus requiring larger values of the couplings $h_i$ and $J_{ij}$ for a correct training of a Boltzmann machine with quantum annealers. It is shown herein that it is possible to use the NQAC encoding to boost the effective value of the couplings: $(h_i, J_{ij}) \rightarrow \mu'_C(h_i, J_{ij})$. This energy boost $\mu_C$ plays a similar role to the energy boost defined above in connection with optimization problems.

Thus, quantum annealers can be used to sample from a thermal distribution of a fully connected Boltzmann machine and an NQAC encoding can boost the strength of the couplers $(h_i, J_{ij})$, thus achieving a reduction of the effective temperature at which the annealer samples.

The effective inverse temperature $\beta_{C,eff}$ can be derived that enters the relation $$\beta_{C,eff}(h_i, J_{ij}) \equiv (b_i, w_{ij}) \qquad (10)$$

and show its dependence as a function of the nesting level C. To do so, one can first define a reduced probability distribution for degenerate states:

$$p(E_i) = \sum_{z|E(z)=E_i} P(z). \qquad (11)$$

Once can now compute numerically the reduced probability distribution $p_T(\rho, E_i)$ above (thermal case) with the weights $b_i = h_i/\rho$ and $w_{ij} = J_{ij}/\rho$ and the experimental distribution $p_{DW}(C, E_i)$ computed by implementing a fully connected graph with C nesting levels with couplings $(h_i, J_{ij})$ in accordance with the quantum annealer to be used. The effective inverse temperature $\beta_{C,eff}$ is obtained by minimizing the following distribution distance:

$$\beta_{C,eff} = \underset{\rho}{\arg\min}\left(\frac{1}{2}\sum_i |p_{DW}(C, E_i) - p(\rho, E_i)|\right) \equiv \underset{\rho}{\arg\min} D(p_{DW}, p_T). \qquad (12)$$

In other words, the effective sampling (inverse) temperature $\beta_{C,eff}$ at which the quantum annealer operates is such that the theoretical reduced (thermal) energy distribution $p(\rho, E_i)$ is as close as possible to the output distribution obtained from the quantum annealer.

Now having obtained the effective sampling temperature, one can determine the "quality" of the distribution obtained from the quantum annealer. In other words, establish if the experimental distribution is a good approximation of a thermal distribution. The figure-of-merit is the "gradient overlap" between the numerically and experimentally determined variations of the weights. Recalling the discussion above about the training of a Boltzmann machine, the weights are adjusted according to the following gradient:

$$\delta w_{ij} \sim \nabla_{ij}^T = \langle z_i z_j \rangle_T. \qquad (13)$$

The subscript is a reminder that the average above is the theoretical (or thermal) gradient. Similarly, one can compute the experimental gradient using the quantum annealer:

$$\nabla_{ij}^{DW} = \langle z_i z_j \rangle_{DW}. \qquad (14)$$

One can treat both $\nabla_{ij}^T$ and $\nabla_{ij}^{DW}$ as vectors and compute their normalized overlap:

$$O = \frac{\prod_{ij} \nabla_{ij}^T \nabla_{ij}^{DW}}{\sqrt{\prod_{ij} \nabla_{ij}^{2T} \prod_{i'j'} \nabla_{i'j'}^{2DW}}}. \qquad (15)$$

One can consider the gradient overlap O because it does not depend on the normalization of the gradients, which correspond to a less important learning rate. A gradient overlap O close to 1 means that the experimentally determined update is very close to the exact and ensures that the training update is performed along the same direction in the parameter space when using both the exact and experimental gradients.

Figure 4:
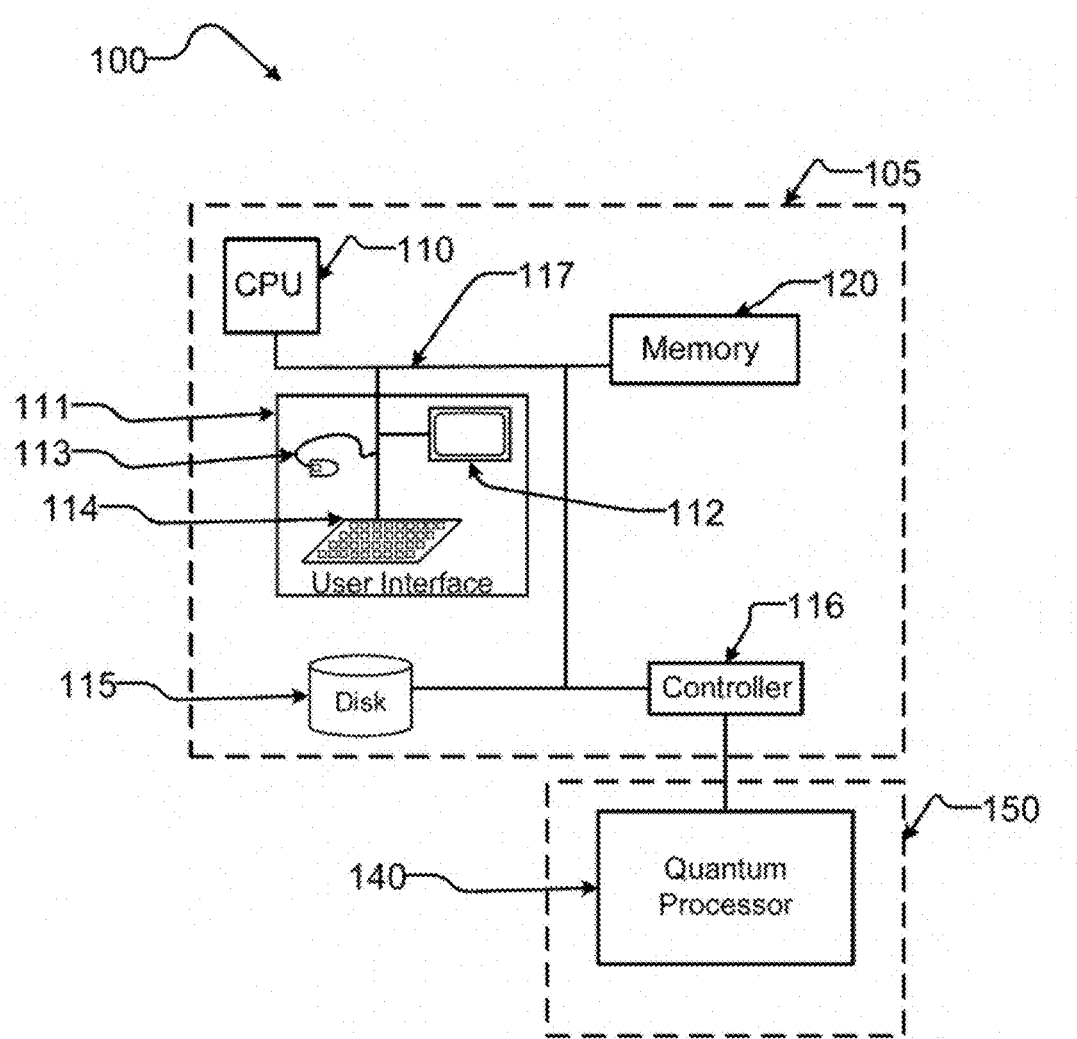
FIG. 4 shows an exemplary system for implementing the various embodiments.

FIG. 4 illustrates an exemplary system for implementing the various embodiments. In particular, FIG. 4 illustrates a hybrid computing system 100 including a digital computer 105 coupled to an analog computer 150. In some implementations analog computer 150 is a quantum processor. The exemplary digital computer 105 includes a digital processor (CPU) 110 that may be used to perform classical digital processing tasks.

Digital computer 105 may include at least one digital processor (such as central processor unit 110 with one or more cores), at least one system memory 120, and at least one system bus 117 that couples various system components, including system memory 120 to central processor unit 110.

The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc., and/or combinations of the same.

Unless described otherwise, the construction and operation of the various blocks shown in FIG. 4 are of conventional design. As a result, such blocks need not be described in further detail herein, as they will be understood by those skilled in the relevant art.

Digital computer 105 may include a user input/output subsystem 111. In some implementations, the user input/output subsystem includes one or more user input/output components such as a display 112, mouse 113, and/or keyboard 114.

System bus 117 can employ any known bus structures or architectures, including a memory bus with a memory controller, a peripheral bus, and a local bus. System memory 120 may include non-volatile memory, such as read-only memory ("ROM"), static random access memory ("SRAM"), Flash NAND; and volatile memory such as random access memory ("RAM") (not shown).

Digital computer 105 may also include other non-transitory computer- or processor-readable storage media or non-volatile memory 115. Non-volatile memory 115 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 115 may communicate with digital processor via system bus 117 and may include appropriate interfaces or controllers 116 coupled to system bus 117. Non-volatile memory 115 may serve as long-term storage for processor- or computer-readable instructions, data structures, or other data (sometimes called program modules) for digital computer 105.

Although digital computer 105 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 120. For example, system memory 120 may store instruction for communicating with remote clients and scheduling use of resources including resources on the digital computer 105 and analog computer 150. Also for example, system memory 120 may store at least one of processor executable instructions or data that, when executed by at least one processor, causes the at least one processor to execute the various algorithms described elsewhere herein, including machine learning related algorithms.

In some implementations system memory 120 may store processor- or computer-readable calculation instructions to perform pre-processing, co-processing, and post-processing to analog computer 150. System memory 120 may store at set of analog computer interface instructions to interact with analog computer 150.

Analog computer 150 may include at least one analog processor such as quantum processor 140. A quantum processor is a computing device that can harness quantum physical phenomena (such as superposition, entanglement, and quantum tunneling) unavailable to non-quantum devices. A quantum processor may take the form of a superconducting quantum processor. A superconducting quantum processor may include a number of qubits and associated local bias devices, for instance two or more superconducting qubits. An example of a qubit is a flux qubit. A superconducting quantum processor may also employ coupling devices (i.e., "couplers") providing communicative coupling between qubits. Further details and embodiments of exemplary quantum processors that may be used to implement the various embodiments are described in, for example, U.S. Pat. Nos. 7,533,068; 8,008,942; 8,195,596; 8,190,548; and 8,421,053. However the various embodiments are not limited to such quantum processors and other types of quantum processors can be used without limitation.

Quantum processor 140 may be a general quantum processor or a more specialized quantum processor, such as a quantum annealing processor. Analog computer 150 can be provided in an isolated environment, for example, in an isolated environment that shields the internal elements of the quantum computer from heat, magnetic field, and other external noise (not shown). The isolated environment may include a refrigerator, for instance a dilution refrigerator, operable to cryogenically cool the analog processor, for example to temperature below approximately 1° Kelvin.

In an exemplary implementation of a system in accordance with the various embodiments, a user would submit the problem to be solved to the digital computer 105 via user interface 111. The digital computer 105 would then convert or encode the problem, as needed, and provide to analog computer 150, via controller 116, for processing using the quantum processor 140, When the processing run is completed, measurements of the qubits at quantum processor 140 are transmitted back to the digital computer 105 for subsequent decoding and processing.

Examples

The examples shown here are not intended to limit the various embodiments. Rather they are presented solely for illustrative purposes.

NQAC Optimization Results

NQAC was tested by studying antiferromagnetic complete graphs numerically, as well as on a D-Wave 2000Q processor featuring 504 flux qubits connected by 1427 tunable composite qubits acting as Ising-interaction couplings, arranged in a non-planar Chimera-graph lattice (complete graphs were also studied for a spin glass model). The data discussed below demonstrates that the encoding schemes of the various embodiments yield a steady improvement for the probability of reaching the ground state as a function of the nesting degree, even after minor-embedding the complete graph onto the physical graph of the quantum annealer. Also demonstrated is that NQAC outperforms classical repetition code schemes that use the same number of physical qubits.

For purposes of illustrating the various embodiments, the following discussion is directed to the more significant results of the testing. However, in the section entitled "Supplemental Information," a more detailed explanation is provided with additional results and details regarding the testing of NQAC.

The hardness of an Ising optimization problem, using a QA device, is controlled by its size N as well as by an overall energy scale $\alpha$. The smaller this energy scale, the higher the effective temperature and the more susceptible QA becomes to (dynamical and thermal) excitations out of the ground state and misspecification noise on the problem Hamiltonian. This provides us with an opportunity to test NQAC. Since in the experiments were limited by the largest complete graph that can be embedded on the D-WAVE 2000Q device, a $K_{32}$ (see SI Sec. IV for details), the hardness of a problem was tuned by studying the performance of NQAC as a function of a via $H_P \rightarrow \alpha H_P$, with $0 < \alpha < 1$. Note that there was no rescale of $\gamma$; instead $\gamma$ was optimized for optimal post-decoding performance (see SI Sec. V). It is known that for the D-WAVE 2000Q, intrinsic coupler control noise can be taken to be Gaussian with standard deviation $\sigma \sim 0.05$ of the maximum value for the couplings [48]. Thus, one may expect that, without error correction, Ising problems with $\alpha < 0.05$ are dominated by control noise.

NQAC was applied to completely antiferromagnetic ($h_i = 0$ $\forall_i$) Ising problems over $K_4(J_{i,j}=1 \; \forall i,j)$, and $K_8$ (random $J_{ij} \in [0.1, 1]$ with steps of 0.1) with nesting up to $C = 8$ and $C = 4$, respectively. $P_C(\alpha)$ denotes the probability to obtain the logical ground state at energy scale $\alpha$ for the C-degree nested implementation (see SI Sec. I for data collection methods). The results of these experiments are shown in FIGS. 5A, 5B, and 5C.

Figure 5A:
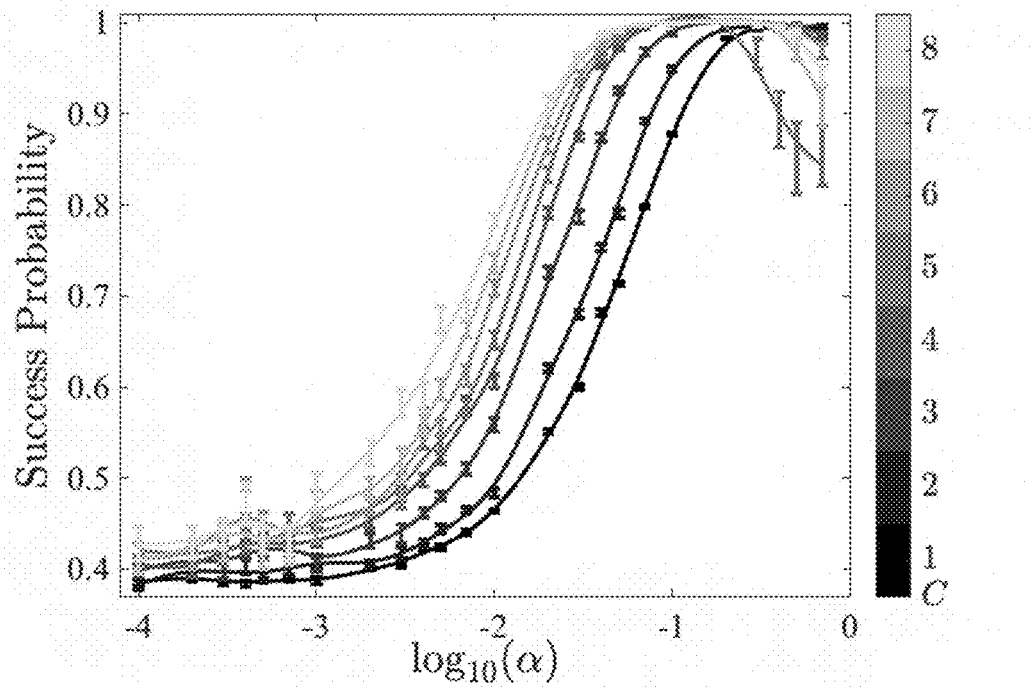
FIGS. 5A-5C show results obtained with a D-Wave 2000Q quantum annealer and with numerical simulations for the antiferromagnetic $K_4$, after encoding, followed by ME and decoding, in accordance with the various embodiments.
Figure 5B:
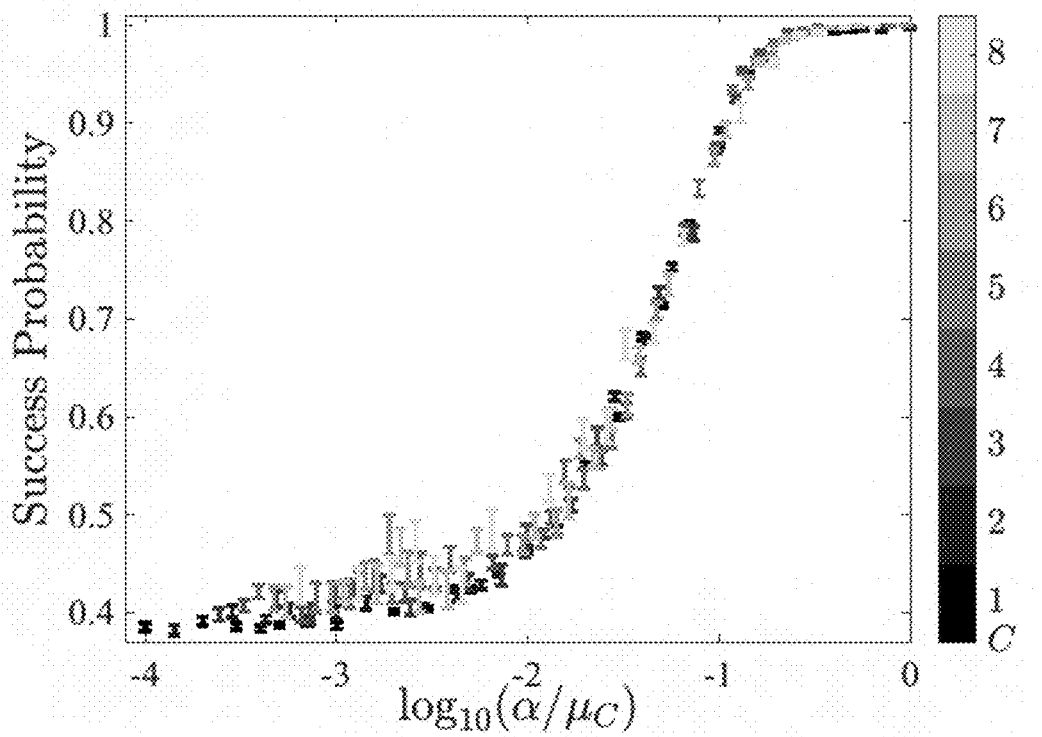
Figure 5C:
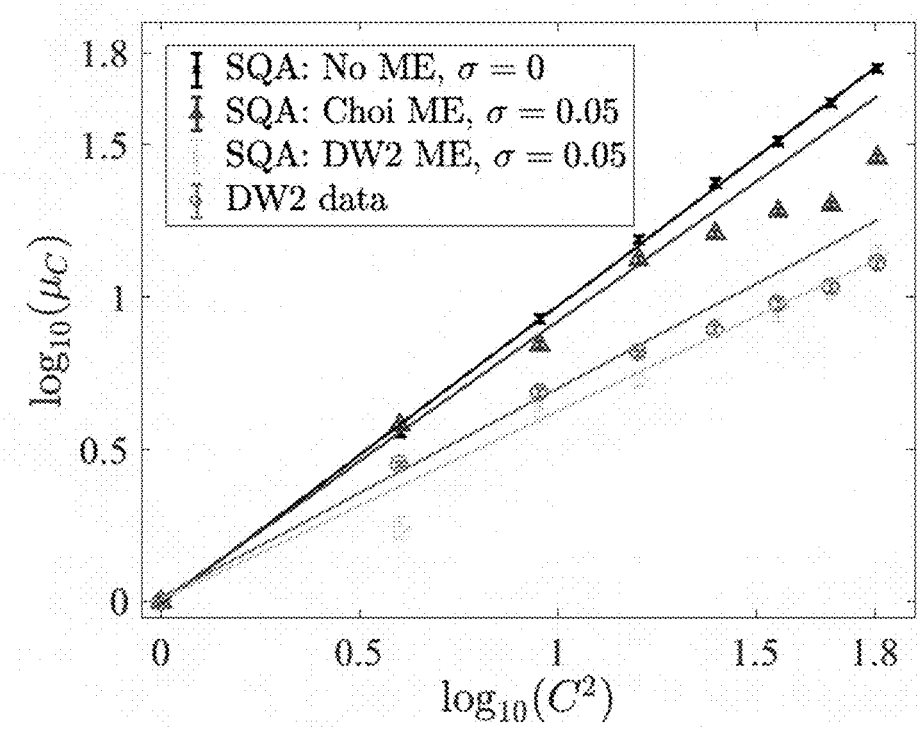

FIGS. 5A-5C show results for the antiferromagnetic $K_4$, after encoding, followed by ME and decoding. FIG. 5A shows D-WAVE 2000Q success probabilities $P_C(\alpha)$ for eight nesting degrees C. Increasing C generally increases $P_C(\alpha)$ at fixed $\alpha$. FIG. 5B shows rescaled $P_C(\alpha \mu_C)$ data, exhibiting data-collapse. FIG. 5C shows scaling of the energy boost $\mu_C$ versus the maximal energy boost $\mu_C^{max}$, for both the D-WAVE 2000Q and SQA. In these figures, purple circles show D-WAVE 2000Q results; blue stars show SQA for the case of no ME (i.e., for the problem defined directly over $K_{C \times N}$ and no coupler noise); red up-triangles show SQA for the Choi ME (for a full Chimera graph), with $\sigma = 0.05$ Gaussian noise on the couplings; and yellow right-triangles show SQA for the D-WAVE 2000Q heuristic ME (applied to a Chimera graph with 8 missing qubits) with $\sigma = 0.05$ Gaussian noise on the couplings. As will be discussed further below, the flattening of $\mu_C$ suggests that the energy boost becomes less effective at large C. However, this can be remedied by increasing the number of SQA sweeps (see SI Sec. III), fixed here at $10^4$. Thus the lines represent best fits to only the first four data points, with slopes 0.98, 0.91, 0.62 and 0.69 respectively. In FIGS. 4A-4C, $N_{phys} \in [8, 488]$.

The experimental QA data in FIG. 5A shows a monotonic increase of $P_C(\alpha)$ as a function of the nesting degree C. over a wide range of energy scales $\alpha$. As expected, $P_C(\alpha)$ drops from $P_C(1) = 1$ (solution always found) to $P_C(0) = 6/16$ (random sampling of 6 ground states, where 4 out of the 6 couplings are satisfied, out of a total of 16 states).

Note that $P_1(\alpha)$ (no nesting) drops by ~50% when $\alpha \sim 0.1$, which is consistent with the aforementioned $\sigma \sim 0.05$ control noise level, while $P_8(\alpha)$ exhibits a similar drop only when $\alpha \sim 0.01$. This suggests that NQAC is particularly effective in mitigating the two dominant effects that limit the performance of quantum annealers: thermal excitations and control errors. To investigate this more closely, FIG. 5B shows that the data from the left panel can be collapsed via $P_C(\alpha) \rightarrow P_C(\alpha/\mu_C)$, where $\mu_C$ is an empirical rescaling factor discussed below (see also SI Sec. VI). This implies that $P_1(\mu_C \alpha) \approx P_C(\alpha)$, and hence that the performance enhancement obtained at nesting degree C. can be interpreted as an energy boost $\alpha \rightarrow \mu_C \alpha$ with respect to an implementation without nesting.

The existence of this energy boost is a key feature of NQAC, as anticipated above. Recall [Eq. (4)] that a nested graph $K_{C \times N}$ contains $C^2$ equivalent copies of the same logical coupling $J_{ij}$. Hence a degree-C nesting before ME can provide a maximal energy boost $\mu_C^{max}$, with $\eta_{max} = 4$. This simple argument agrees with the reduction of the effective temperature by $C^2$ based on the calculation of the free energy (5). FIG. 5C shows $\mu_C$ as a function of $\mu_{max}$, yielding $\mu_C \sim C^\eta$ with $\eta \approx 1.37$ (grey circles). To understand why $\eta < \eta^{max}$, simulated quantum annealing (SQA) simulations were performed (see SI Sec. VII for details). Once can observe in FIG. 5C that without ME and control errors, the boost scaling matches $\mu_C^{max}$ (dark stars). When including ME and control errors a performance drop results (dark triangles). Both factors thus contribute to the sub-optimal energy boost observed experimentally. However, the optimal energy boost is recovered for a fully thermalized state with a sufficiently large penalty (see SI Sec. III). To match the experimental D-WAVE 2000Q results using SQA the Choi ME designed for full Chimera graphs was replaced by the heuristic ME designed for Chimera graphs with missing qubits, and achieve a near match (light triangles) (see SI Sec. IV for more details on ME).

Performance of NQAC Vs Classical Repetition

Recall that $N_C^{phys} = CNL$ is the total number of physical qubits used at nesting degree C.; let $C_{max}$ denote the highest nesting degree that can be accommodated on the QA device for a given $K_N$, i.e., $C_{max}NL \leq N_{tot} < (C_{max}+1)NL$, where $N_{tot}$ is the total number of physical qubits (504 in the experiments). Then $M = [N_{C_{max}}^{phys}/N_C^{phys}]$ is the number of copies that can be implemented in parallel. For NQAC at degree C. to be useful, it must be more effective than a classical repetition scheme where M copies of the problem are implemented in parallel. If a single implementation has success probability $P_C(\alpha)$, the probability to succeed at least once with M statistically independent implementations is $P_C'(\alpha) = 1 - [1 - P_C(\alpha)]^{M_C}$. It turns out that the antiferromagnetic $K_4$ problem, for which a random guess succeeds with probability 6/16, is too easy [i.e., $P_C'(\alpha)$ approaches 1 too rapidly], and therefore once can consider a harder problem: an antiferromagnetic $K_8$ instance with couplings randomly generated from the set $J_{ij} \in \{0.1, 0.2, \ldots, 0.9, 1\}$ (see SI Sec. V for more details and data on this and additional instances). Problems of this type turn out to have a sufficiently low success probability for purposes of the methodology of the various embodiments, and can still be nested up to $C = 4$ on the D-Wave 2000Q processor.

Figure 6A:
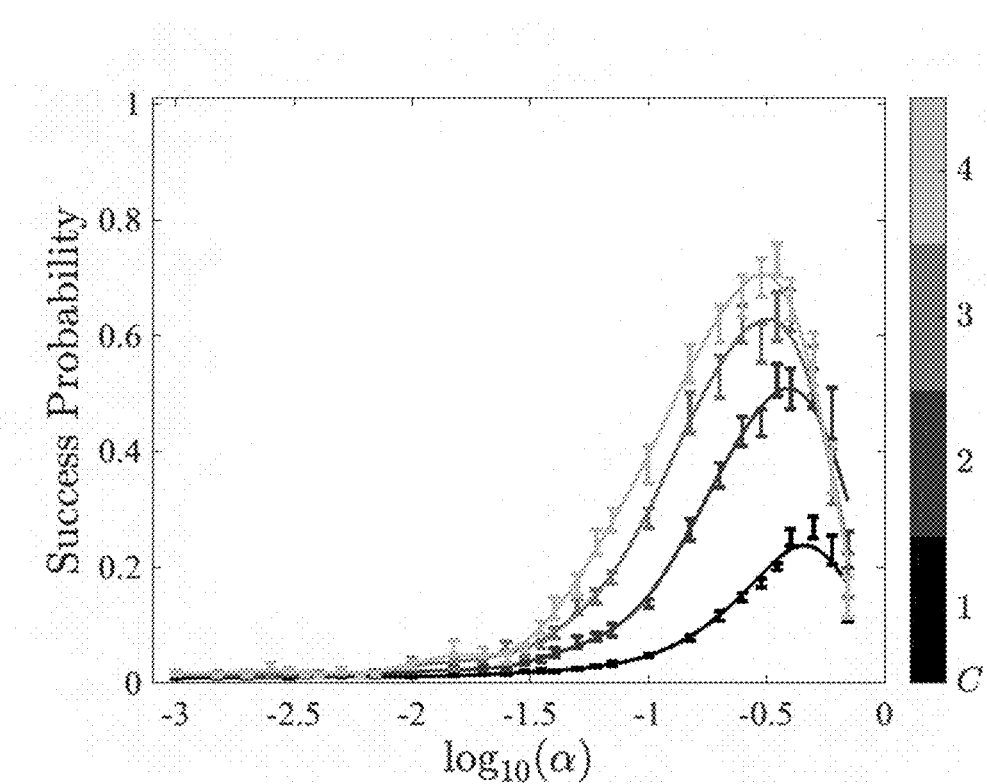
FIGS. 6A-6C show random antiferromagnetic $K_8$ results obtained with a D-Wave 2000Q quantum annealer and with numerical simulations, in accordance with the various embodiments.
Figure 6B:
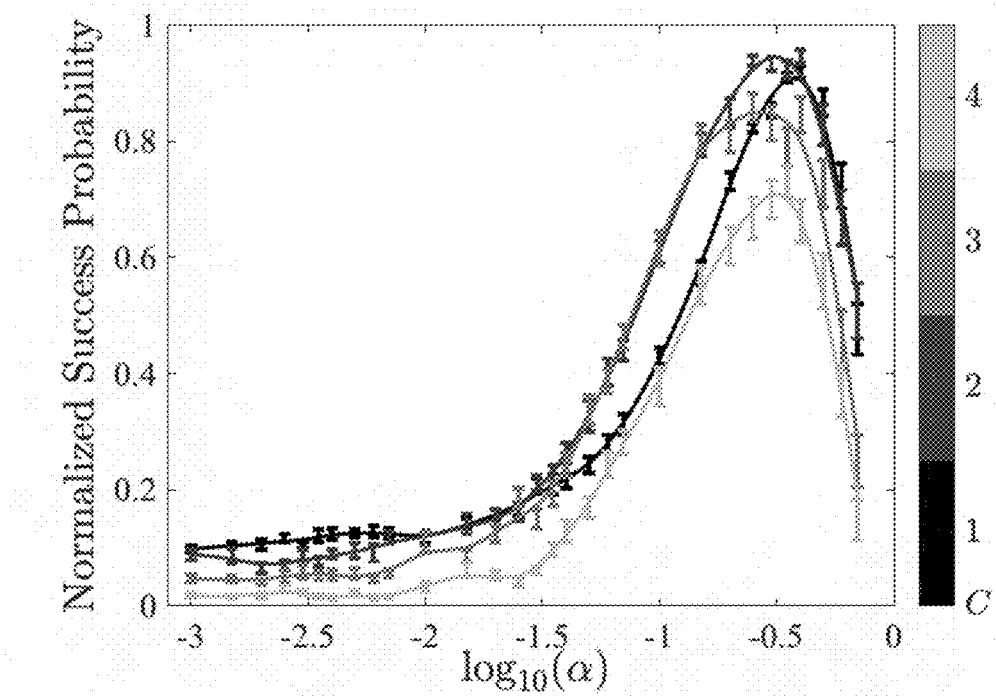
Figure 6C:
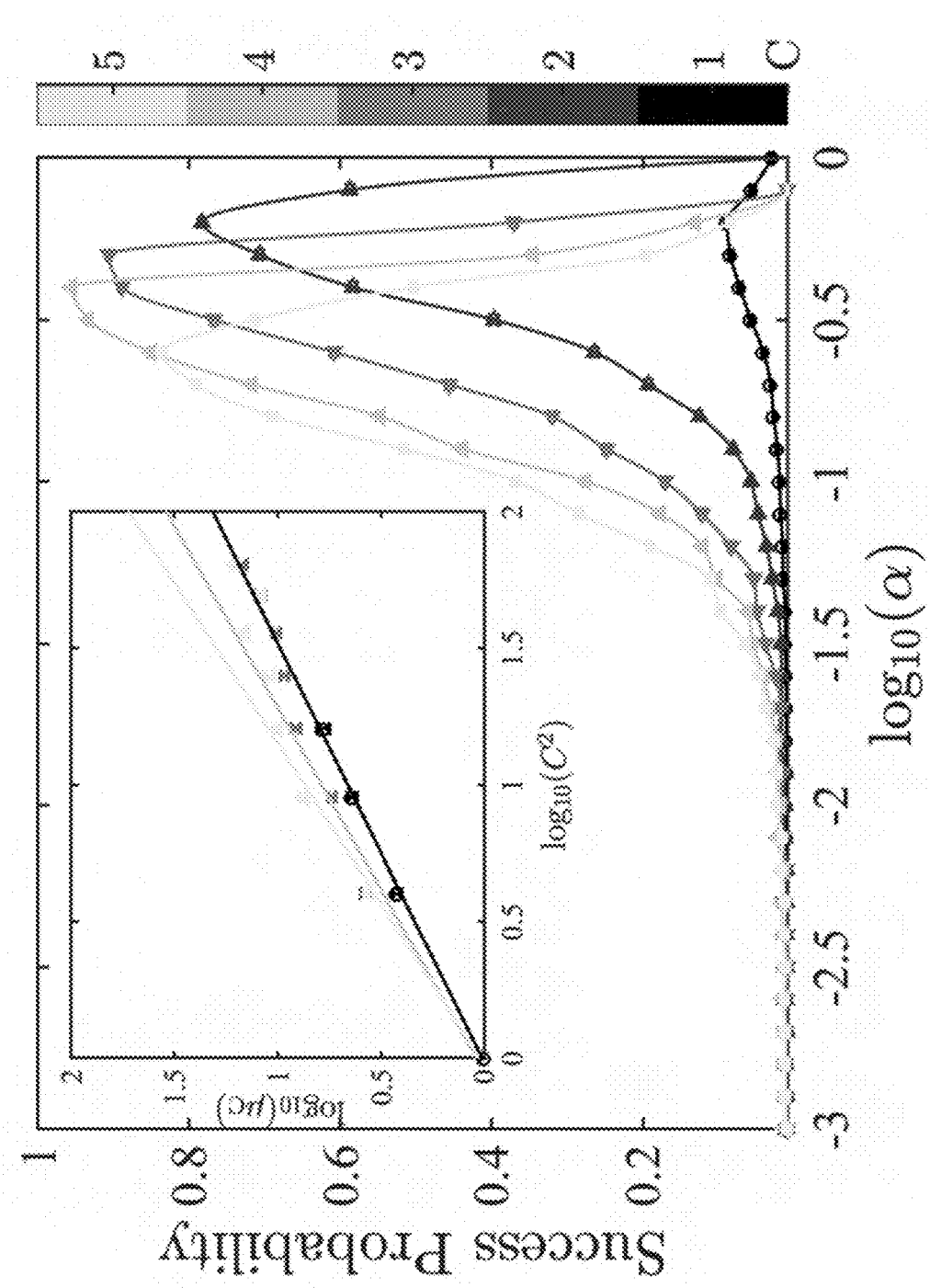

FIGS. 6A-6C show random antiferromagnetic $K_8$ results. FIG. 5A shows success probabilities $P_C(\alpha)$ for four nesting degrees. FIG. 6B shows success probabilities $P_C'(\alpha)$ adjusted for classical repetition. FIG. 6C shows numerical results for SQA simulations with 20000 sweeps, $\sigma = 0.05$ Gaussian noise on the couplings, and with the Choi embedding, showing five nesting degrees. The inset in FIG. 6C shows scaling of the energy boost $\mu_C$ versus the maximal energy boost $\mu_C^{max}$, for both the D-Wave 2000Q and SQA. In these figures, circles show D-Wave 2000Q results; crosses and up-triangles show SQA for the Choi ME with 10000 (crosses) and 20000 (up-triangles) sweeps, and with $\sigma = 0.05$ Gaussian noise on the couplings. The flattening of $\mu_C$ for $C > 4$ suggests that the energy boost becomes less effective at large C, but increasing the number of sweeps recovers the effectiveness. The lines represent best fits to only the first four data points, with respective slopes $\eta/2$=0.65, 0.75, and 0.85.

As noted above, results for $P_C(\alpha)$ are shown in FIG. 6A, and again increase monotonically with C, as in the $K_4$ case. For each C, $P_C(\alpha)$ peaks at a value of $\alpha$ for which the maximum allowed strength of the energy penalties $\gamma=1$ is optimal ($\gamma>1$ would be optimal for larger $\alpha$, as shown in SI Sec. V; the growth of the optimal penalty with problem size, and hence chain length, is a typical feature of minor-embedded problems). An energy-boost interpretation of the experimental data of FIG. 6A is possible for $\alpha$ values to the left of the peak; to the right of the peak, the performance is hindered by the saturation of the energy penalties.

FIG. 6B compares the success probabilities $P_C'(\alpha)$ adjusted for classical repetition, having set $C_{max}$=4, and shows that $P_2'(\alpha) > P_1'(\alpha)$, i.e., even after accounting for classical parallelism C=2 performs better than C=1. However, $P_4'(\alpha) < P_3'(\alpha) \leq P_2'(\alpha)$, so no additional gain results from increasing C in the experiments. This can be attributed to the fact that even the $K_8$ problem still has a relatively large $P_1(\alpha)$. Experimental tests on QA devices with more qubits will thus be important to test the efficacy of higher nesting degrees on harder problems.

To test the effect of increasing C, and also to study the effect of varying the annealing time, FIG. 6C presents the performance of SQA on a random $K_8$ antiferromagnetic instance with the Choi ME. The results are qualitatively similar to those observed on the D-WAVE 2000Q processor with the heuristic ME [FIG. 6A]. Interestingly, one can observe a drop in the peak performance at C=5 relative to the peak observed for C=4. One can attribute this to both a saturation of the energy penalties and a suboptimal number of sweeps. The latter is confirmed in the inset in FIG. 3C, where one can observe that the scaling of $\mu_C$ with C is better for the case with more sweeps, i.e., again $\mu_C \sim C^\eta$, and $\eta$ increases with the number of sweeps.

Nested QAC offers several significant improvements over previous approaches to the problem of error correction for QA. It is a flexible method that can be used with any optimization problem, and allows the construction of a family of codes with arbitrary code distance. The results show that nesting is effective by performing studies with a D-Wave QA device and numerical simulations. Further, the protection from errors provided by NQAC can be interpreted as arising from an increase (with nesting degree C.) in the energy scale at which the logical problem is implemented. This represents a very useful tradeoff: the effective temperature drops as one increases the number of qubits allocated to the encoding, so that these two resources can be traded. Thus NQAC can be used to combat thermal excitations, which are the dominant source of errors in open-system QA, and are the bottleneck for scalable QA implementations, assuming that closed-system Landau-Zener transitions have been suppressed using other methods. Also demonstrated is that an appropriate nesting degree can outperform classical repetition with the same number of qubits, with improvements to be expected when next-generation QA devices with larger numbers of physical qubits become available.

NQAC Sampling Results

Figure 7A:
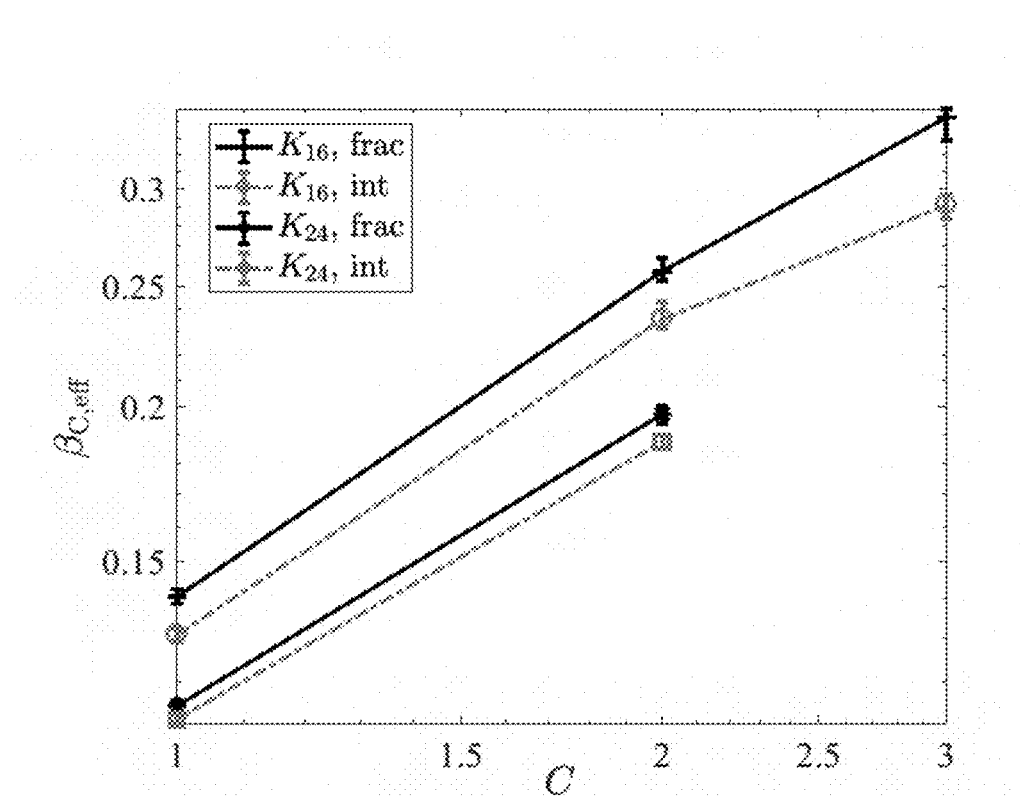
FIGS. 7A-7B show some experimental results obtained with a D-Wave 2000Q quantum annealer and with numerical simulations on four ensembles of 100 fully connected weighted graphs on N=16 and N=24 variables which can be encoded with up to C=3 and C=2 nesting levels respectively on the D-Wave 2000Q quantum annealer.
Figure 7B:
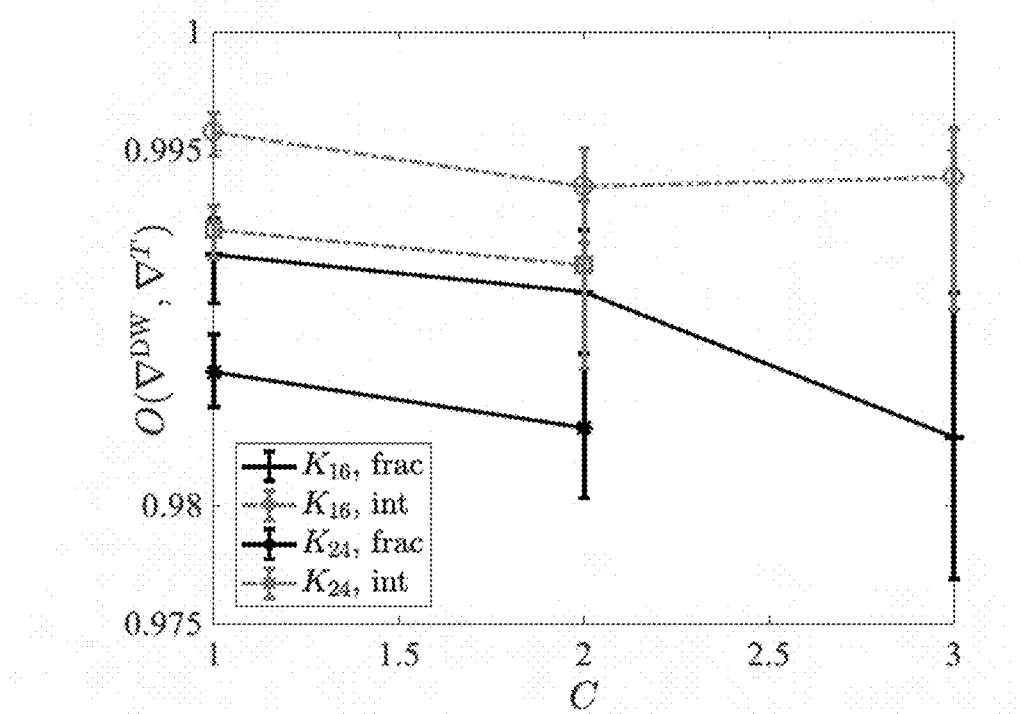

In FIGS. 7A and 7B there are shown some experimental results obtained on four ensembles of 100 fully connected weighted graphs on N=16 and N=24 variables which can be encoded with up to C=3 and C=2 nesting levels respectively on the D-WAVE 2000Q000Q quantum annealer.

FIG. 7A shows the increase of the sampling inverse temperature as a function of the nesting level C. FIG. 7B shows the gradient overlap remaining close to 1 as a function of the nesting level C.

The weights of the instances of the ensembles are randomly picked within the set $\{\pm 1\}$ (int) and $\{\pm 0.1, \pm 0.2, \ldots, \pm 1\}$ (frac). FIG. 7A shows the monotonic boost of the effective (inverse) sampling temperature $\beta_{C,eff}$ as a function of the nesting level. In FIG. 7B, the gradients overlaps are shown. The gradient overlaps are remarkably close to 1, for all ensembles and levels of nesting.

FIGS. 7A and 7B give evidence that non-native (minor embedded) graphical models can be trained with quantum annealers and that NQAC can be additionally implemented to effectively boost the value of the physical couplings $(h_i, J_{ij}) \rightarrow \mu'_C(h_i, J_{ij})$, where $\mu'_C = \beta_{C,eff}/\beta_{1,eff}$ thus overcoming a fundamental technical limitation of quantum annealing devices.

While various embodiments of the present invention have been described above and the in the Supplemental Information section that follows, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Supplemental Information

The following section is provided supplement and enhance understanding of the results discussed above. However, nothing in this section is intended to limit the various embodiments.

I. Experimental Methods

As noted above in the Examples section, NQAC was tested on the D-WAVE 2000Q quantum annealing device at the University of Southern California's Information Sciences Institute (USC-ISI), which has been described in numerous previous publications (e.g., see [1]). The largest complete graph that can be embedded on this device, featuring 504 active qubits, is a $K_{32}$.

An experimental value of the success probability $P_C(\alpha, \gamma)$ was determined as a function of the energy penalty strength $\gamma$. All figures show, whenever the $\gamma$ dependence is not explicitly considered, the optimal value $P_C(\alpha) = \max_\gamma P_C(\alpha, \gamma)$, with $\gamma \in \{0.05, 0.1, 0.2, \ldots, 0.9, 1\}$. One can used the same penalty value for both the nesting and the ME. In principle these two values can be optimized separately for improved performance, but this was not pursued since the resulting improvement is small, as shown in FIG. 5, and costly since each instance needs to be rerun at all penalty settings.

Figure 8:
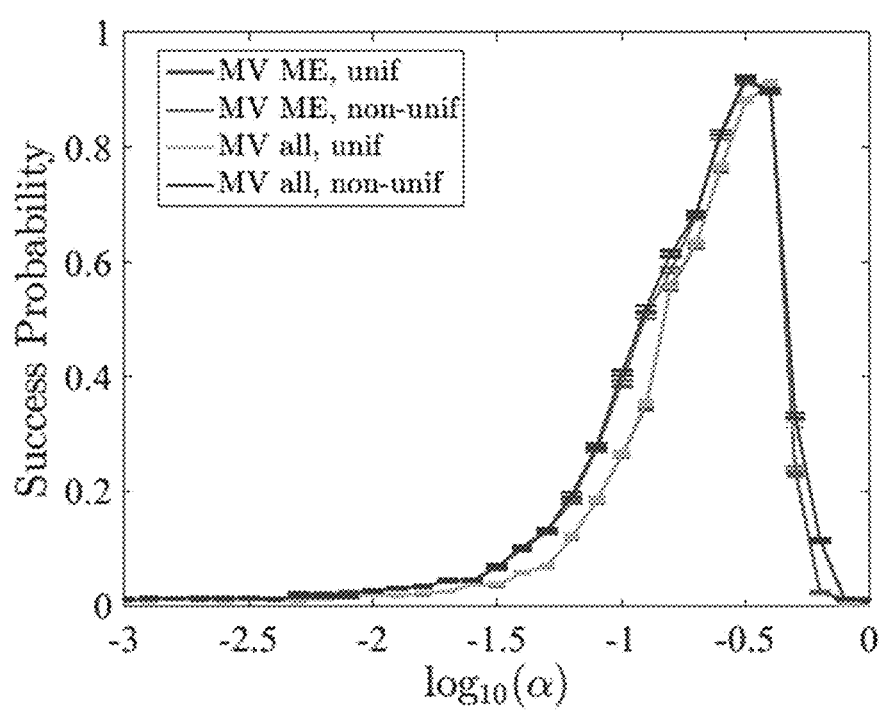
FIG. 8 is a plot showing the effect of separately optimizing γ for ME and penalties obtained with numerical simulations.

FIG. 8 shows the effect of separately optimizing $\gamma$ for ME and penalties. The plot shows the success probability from SQA simulations, for NQAC applied to a random antiferromagnetic $K_8$ with 10,000 sweeps, $\sigma = 0.05$ noise, Choi embedding, with $\beta = 0.1$. The results obtained after separately optimizing the penalty for the nesting and for the ME are denoted "non-unif", while the results for using a single penalty for both (the strategy used in the main text) is denoted "unif". The former results in a small improvement. Also shown is that separate ("MV ME") or joint ("MV all") majority vote decoding of the nesting and the ME has no effect.

Each $P_C(\alpha, \gamma)$ is the overall success probability after $2 \times 10^4$ annealing runs obtained by implementing 20 programming cycles of $10^3$ runs each. A sufficiently large number of programming cycles is necessary to average out intrinsic control errors (ICE) that, as explained in the main text, prevent the physical couplings to be set with a precision better than ~5%. To further remove possible sources of systematic noise, at each programming cycle a random gauge transformation is performed on the values of the physical qubits. A permutation of the C×N vertices is a symmetry of the nested graph but it is not a symmetry of the encoded Hamiltonian obtained after ME. This is because the C×N chains of physical qubits are physically distinguishable. In each programming cycle also performed was a random permutation of the vertices of the nested graph, before proceeding to the ME. Error bars correspond to the standard error of the mean of the 20 $P_C(\alpha)$ values.

II. Mean Field Analysis of the Partition Function

In this section how to compute the partition function of the logical problem [Eq. (3)] is sketched, in order to analyze the effect of nesting. Previously, considered were Hamiltonians of the form:

$$H = B(t)(H^x + H^z) \tag{S.1}$$

where $$H^x = [A(t)/B(t)]H_X = -\Gamma(t) \sum_{i=1}^{N} \sum_{c_i=1}^{C} \sigma_{ic_i}^x \tag{S.2a}$$

$$H^z = \overline{H}_P = \sum_{i,j=1}^{N} \sum_{c_i, c'_j = 1}^{C} J_{(ic_i),(jc'_j)} \sigma_{ic_i}^z \sigma_{jc'_j}^z \tag{S.2b}$$

$$= \frac{J}{N} \sum_{i \neq j} \sum_{c_i, c'_j = 1}^{C} \sigma_{ic_i}^z \sigma_{jc'_j}^z - \gamma \sum_{i=1}^{N} \sum_{c_i \neq c'_i} \sigma_{ic_i}^z \sigma_{ic'_i}^z, \tag{S.2c}$$

$A(t)$, $B(t)$ have dimensions of energy, and where $J$ and $\gamma$ are dimensionless, and have each absorbed a factor of ½ to account for double counting. Note that both $H^x$ and $H^z$ are extensive (proportional to N). Throughout $\sigma_{ic}^z \equiv \sigma_{ic_i}^z$ ($\sigma_{ic}^x \equiv \sigma_{ic_i}^x$) us used to denote the Pauli z(x) operator acting on physical qubit c of encoded qubit i.

One can define the collective variables $$S_i^x \equiv \frac{1}{C} \sum_{c_i=1}^{C} \sigma_{ic_i}^x, \quad S_i^z \equiv \frac{1}{C} \sum_{c_i=1}^{C} \sigma_{ic_i}^z, \tag{S.3}$$

$$S^x \equiv \frac{1}{N} \sum_{i=1}^{N} S_i^x, \quad S^z \equiv \frac{1}{N} \sum_{i=1}^{N} S_i^z.$$

Once can interpret $S_i^x$ and $S_i^z$ as the mean transverse and longitudinal fields on logical qubit i, respectively. Then $$H^x = -\Gamma(t) C \sum_{i=1}^{N} S_i^x = -NC\Gamma(t)S^x, \tag{S.4}$$

and $$\overline{H}_P = \tag{S.5}$$

$$\frac{J}{N} C^2 \sum_{i,j} S_i^z S_j^z - \left(\frac{J}{N} + \gamma\right) \sum_{i=1}^{N} \sum_{c_i, c'_i} \sigma_{ic_i}^z \sigma_{ic'_i}^z + \gamma \sum_{i=1}^{N} \sum_{c_i} (\sigma_{ic_i}^z)^2,$$

but the last term is a constant [equal to $\gamma NC\mathbb{1}$], so it can be ignored. Therefore, up to a constant:

$$\overline{H}_P = JNC^2 \left((S^z)^2 - \lambda \frac{1}{N} \sum_{i=1}^{N} (S_i^z)^2\right), \tag{S.6}$$

where $$\lambda = \frac{\gamma}{J} + \frac{1}{N} \geq 0, \tag{S.7}$$

encodes the penalty strength; the 1/N correction will disappear in the thermodynamic limit. Note that $$\frac{1}{N} \sum_{i=1}^{N} (S_i^z)^2 = O(1),$$

so that $$\lambda \frac{1}{N} \sum_{i=1}^{N} (S_i^z)^2 = O(1),$$

like $(S_i^z)^2$, and hence $\overline{H}_P$ is extensive in N, as it should be.

The form (S.6) for $\overline{H}_P$ shows that the NQAC Hamiltonian in the fully antiferromagnetic $K_{N \times C}$ case can be interpreted as describing the collective evolution of all logical qubits. The term $$\lambda \frac{1}{N} \sum_{i=1}^{N} (S_i^z)^2$$

favors all the spins of each logical qubit (where "spin" refers to the qubit at $t=t_f$) being aligned, since this maximizes each summand.

A. Partition Function Calculation

One starts with the partition function $$Z = Tr\ e^{-\beta H} = Tr\ e^{-\beta B(t)[H^x + H^z]} = Tr\ e^{-\theta[H^x + H^z]}, \quad (S.8)$$

Where $\theta = \beta B(t)$ is the dimensionless inverse temperature. One can write the partition function explicitly as:

$$Z = \sum_{\{\sigma^z\}} \langle \{\sigma^z\}|\exp[-\theta(H^z + H^x)]|\{\sigma^z\}\rangle = \lim_{M \to \infty} Z_M, \quad (S.9)$$

where $\sum_{\{\sigma^z\}}$ is a sum over all possible $2^{CN}$ spin configurations in the z basis, and $|\{\sigma^Z\}\rangle = \otimes_{i=1}^{N} \otimes_{c=1}^{C} |\sigma_{ic}^{Z}\rangle$. $Z_M$ is determined using the Trotter-Suzuki formula $e^{A+B} = \lim_{M \to \infty} (e^{A/M} e^{B/M})^M$:

$$Z_M = \sum_{\{\sigma^z\}} \langle \{\sigma^z\}|\left(\exp\left[-\frac{\theta}{M}H^z\right]\exp\left[-\frac{\theta}{M}H^x\right]\right)^M|\{\sigma^z\}\rangle. \quad (S.10)$$

After a lengthy calculation one can find $$Z \approx \int \prod_j \mathcal{D}m_j \mathcal{D}\tilde{m}_j \quad (S.11)$$

$$e^{N\left[\frac{1}{N}\sum_{j=1}^{N}\left\{C\ln\left[2\cosh((\theta\Gamma)^2 - (\tilde{m}_j/C)^2)^{1/2}\right] + m_j(i\tilde{m}_j + \theta JC^2\lambda m_j)\right\} - \theta JC^2\langle m\rangle^2\right]},$$

where $\langle m \rangle \equiv \frac{1}{N}\sum_{j=1}^{N} m_j$, and where $m_j$ is the Hubbard-Stratonovich field that represents $S_j^z(\alpha)$ after the static approximation N (i.e., dropping the $\alpha$ dependence). The second Hubbard-Stratonovich field $\tilde{m}_j$ acts as a Lagrange multiplier.

B. Free Energy

In the large $\beta$ (low temperature) limit, the partition function is dominated by the global minimum. This minimum is given by $\langle m \rangle = 0$, which corresponds to either a paramagnetic phase (all $m_j = 0$) or a symmetric phase ($m_j = \pm m$ in equal numbers). It can be shown that the system undergoes a second order QPT, with the critical point moving to the left as C and $\gamma$ grow. Using a saddle point analysis of the partition function one can show that $\tilde{m}_j = \pm 2i\theta C^2 J\lambda m$, and hence, the dominant contribution to the partition function is given by:

$$Z_C \approx e^{N\left\{C\ln\left[2\cosh((\theta\Gamma)^2 + (2\theta JC\lambda m)^2)^{1/2}\right] - \theta JC^2\lambda m^2\right\}} \quad (S.12a)$$

$$= e^{N\left\{C\ln\left[2\cosh\left([\beta A(t)]^2 + [2\beta B(t)C(\gamma + \frac{J}{N})m]^2\right)^{1/2}\right] - \beta B(t)C^2\left(\gamma + \frac{J}{N}\right)m^2\right\}}. \quad (S.12b)$$

For $B(t) > 0$ and in the low temperature limit ($\theta \gg 1$) one can approximate $2\cos h(\theta|x|)$ as $e^{\theta|x|}$, $$Z_C \approx e^{N\theta\left\{((C\Gamma)^2 + (2J\lambda C^2 m)^2)^{1/2} - J\lambda C^2 m^2\right\}} \quad (S.13a)$$

$$= e^{N\beta\left\{([CA(t)]^2 + [2B(t)(\gamma + \frac{J}{N})C^2 m]^2)^{1/2} - B(t)(\gamma + \frac{J}{N})C^2 m^2\right\}} \quad (S.13b)$$

$$= e^{-\beta NF},$$

where in the second line reintroducing the physical inverse temperature $\beta$ [recall Eq. (S.8)]. Factoring out $C^2$ and taking the large N limit then directly yields the free energy density expression Eq. (5).

III. Additional Numerical Data

Figure 9A:
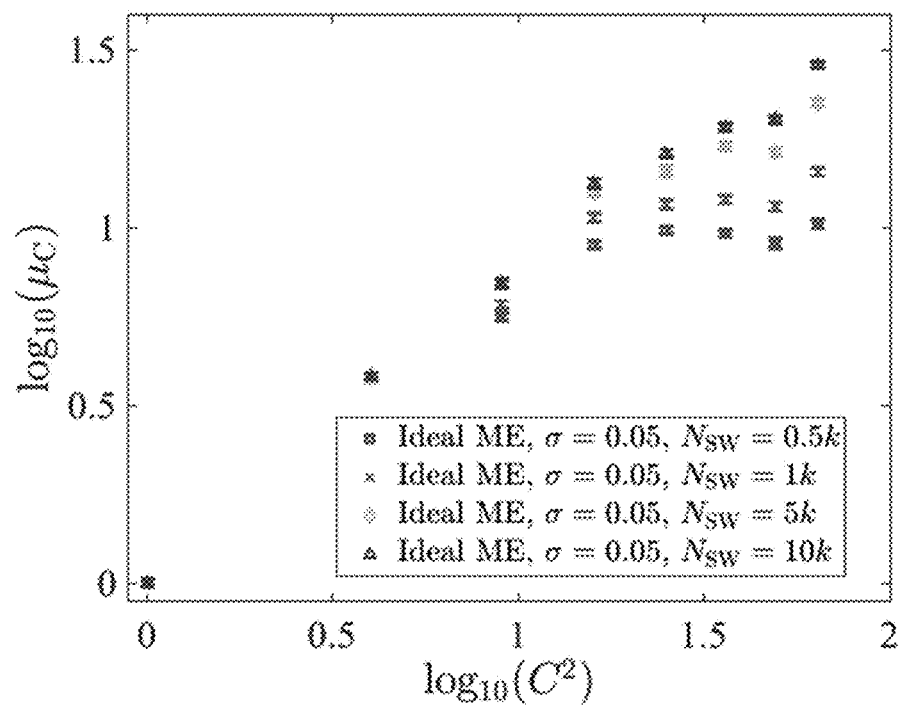
FIGS. 9A and 9B show saturation removal for NQAC applied to antiferromagnetic $K_4$ in accordance with the various embodiments obtained with numerical simulations.
Figure 9B:
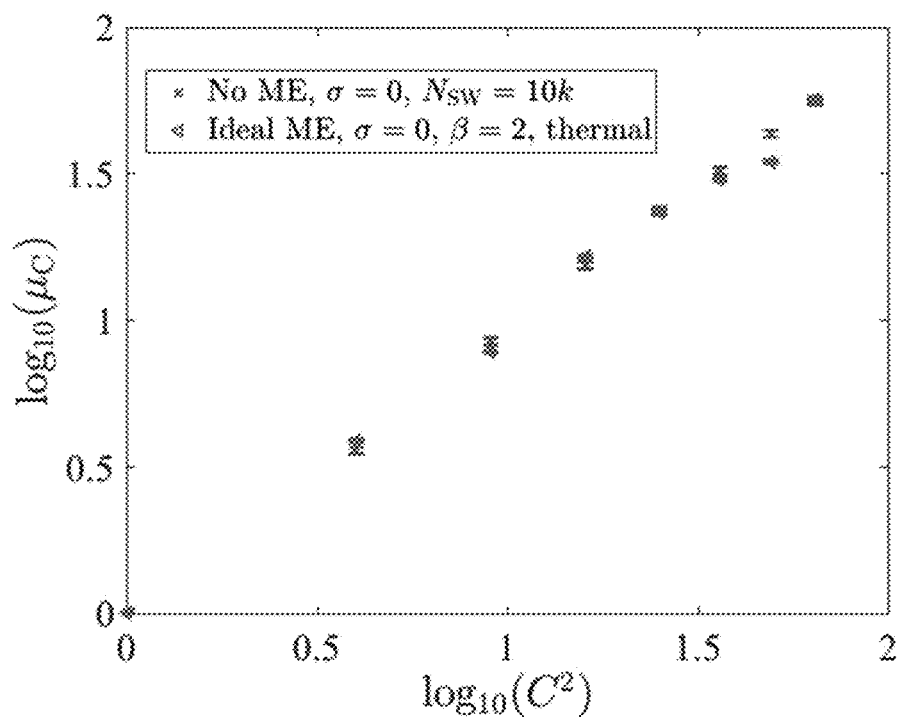

FIGS. 9A and 9B show saturation removal for NQAC applied to antiferromagnetic $K_4$. FIG. 9A shows SQA results. As one increases the number of sweeps, the flattening of $\mu_C$ is slowly removed. FIG. 9B shows parallel tempering (infinite sweep number) results. A thermal distribution on the ME fully recovers the no-ME scaling.

In particular, FIG. 9A shows that the saturation of $\mu_C$ at large C is removed when the number of sweeps is increased. The thermal state, where the system has fully thermalized, can be understood as the limit of an infinite number of sweeps. FIG. 9B shows that the saturation is fully removed for the thermal state (generated using parallel tempering), and nesting is then equivalent to an energy (or temperature) boost close to the ideal result $\mu_{max}^C = C^2$. This suggests that for a sufficiently large sweep number, performance can be brought to near the ideal result.

Figure 10A:
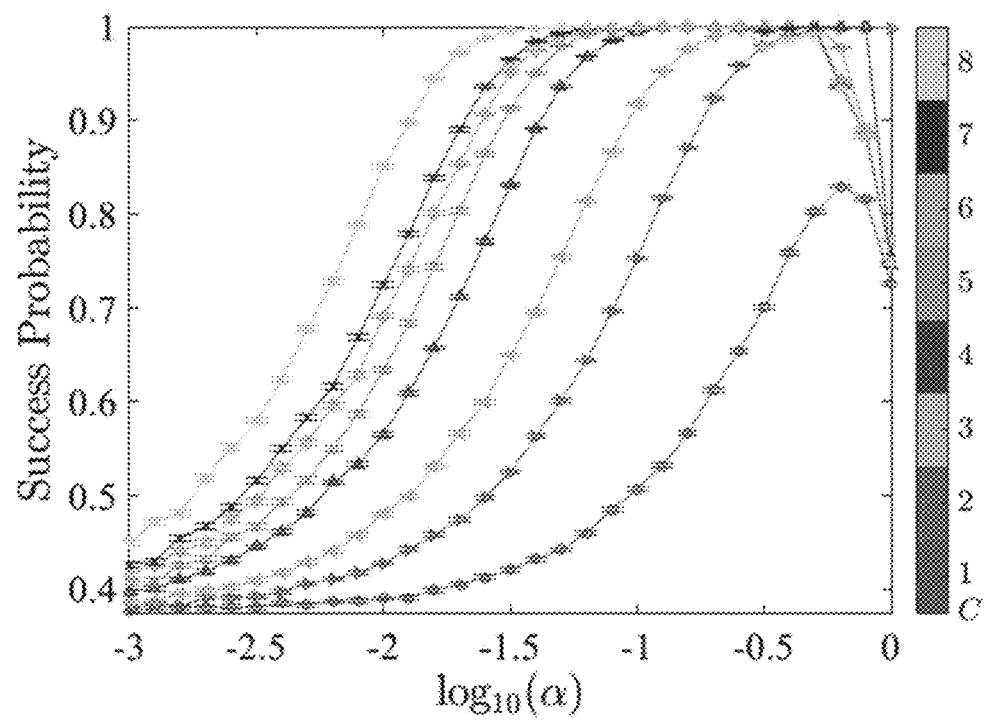
FIGS. 10A-10C show parallel tempering (PT) results for antiferromagnetic K4 with no noise on the couplers, in accordance with the various embodiments.
Figure 10B:
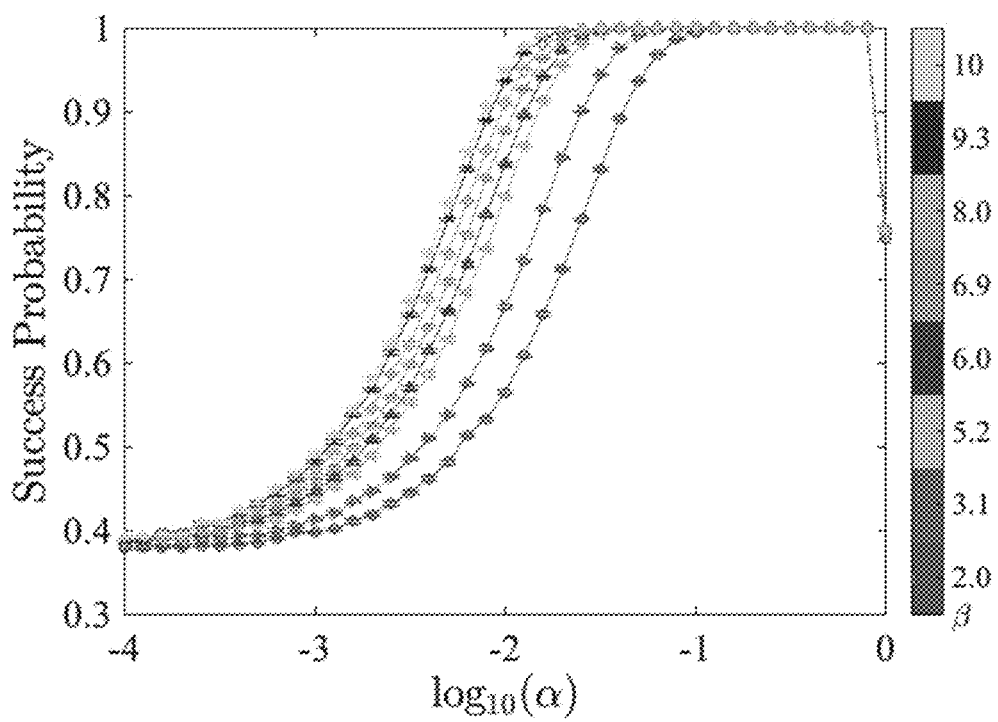
Figure 10C:
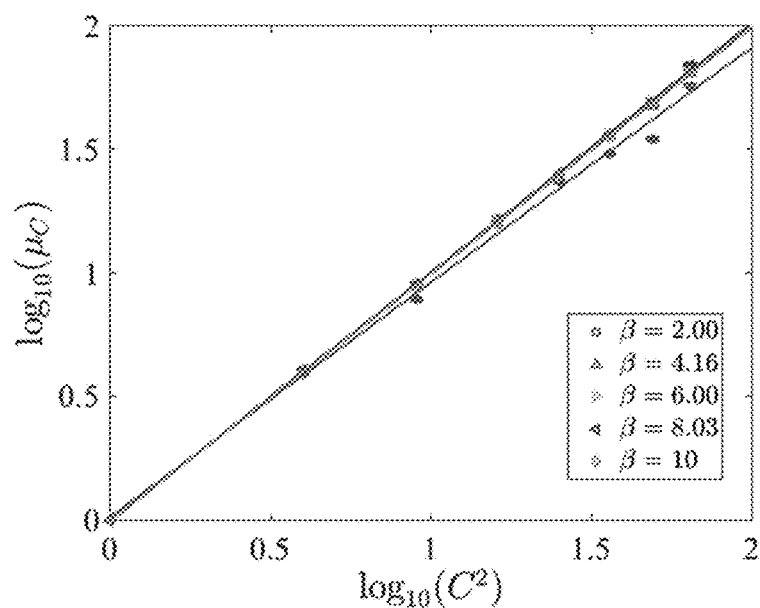

FIGS. 10A-10C show parallel tempering (PT) results for antiferromagnetic K4 with no noise on the couplers. PT was used to generate a thermal state with respect to the ME, which was then decoded using majority voting. FIG. 10A shows success probabilities for different nesting degrees C. at $\beta = 2$. FIG. 10B shows success probabilities for different inverse temperatures at C=4. FIG. 10C shows scaling of $\mu_C$ for the thermal state. The solid lines represent the best linear fit to all the data points. All the best-fit lines have slopes greater than 0.95, so one can find that the optimal scaling of $\mu_C \sim C^2$ is recovered at all (sufficiently large) inverse temperatures tested. This illustrates that for a sufficiently cold equilibrated system ME does not result in a suboptimal energy boost.

FIGS. 10A-10C give further evidence that nesting can be interpreted as an effective reduction of temperature by studying the success probability associated with the thermal distribution on the ME. Parallel tempering (PT) was used to sample from the thermal state associated with the ME of the different NQAC cases shown in FIGS. 4A-4C, and decoded using majority voting. One can find that the thermal state at different temperatures but fixed C, exhibits the same qualitative behavior as the thermal state at fixed temperature but different C [see FIG. 10A versus FIG. 10B]. Therefore, the performance improvement associated with reducing the temperature can also be reproduced by increasing C. This enforces that the energy boost can also be interpreted as decrease of the effective temperature of the device. One can also find that the thermal state exhibits an energy boost scaling of $\mu_C \sim C^2$ [see FIG. 10C].

IV. Choi And Heuristic Embedding

The "Chimera" hardware connectivity graph of the D-Wave devices allows for a ME of complete graphs. Above, this is identified as "Choi minor embedding".

Figure 11A:
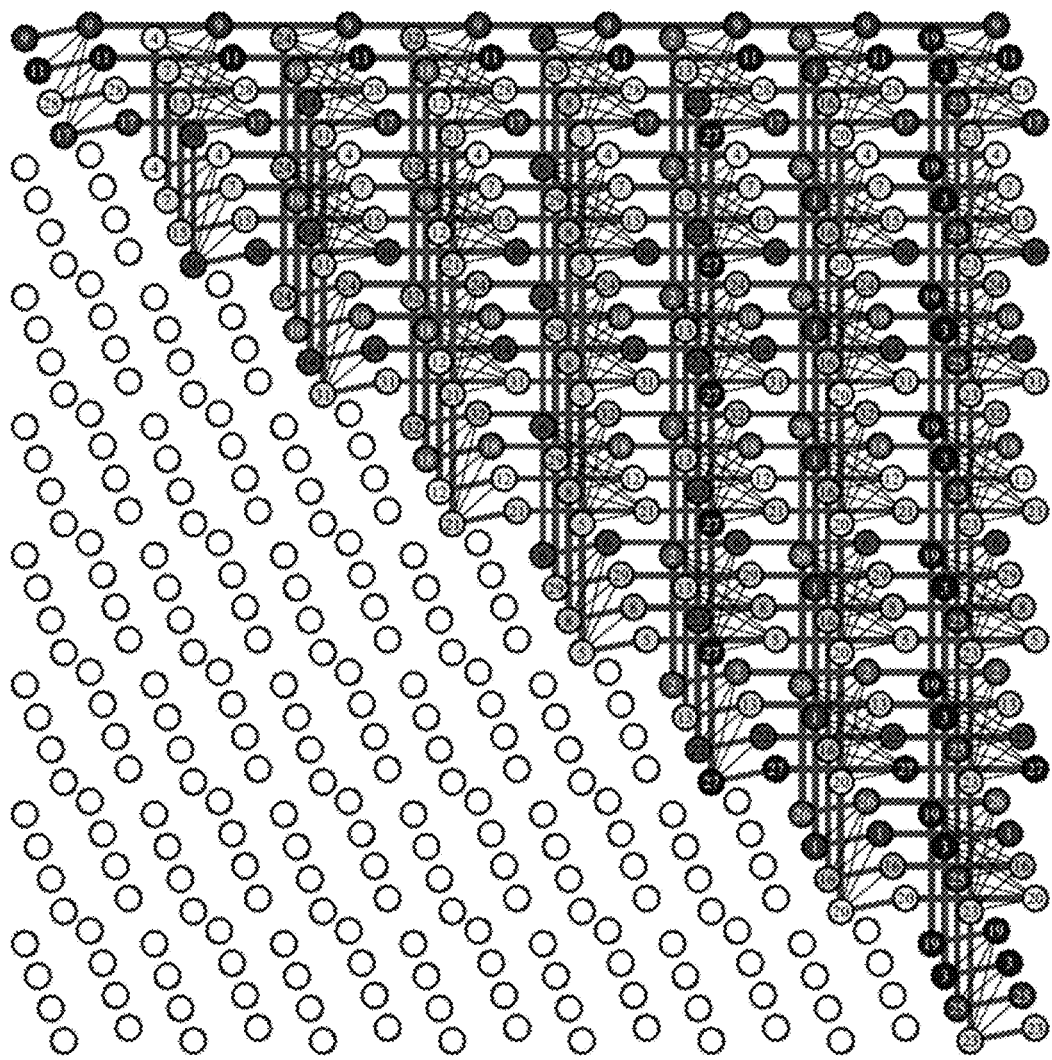
FIGS. 11A and 11B show MEs of a $K_{32}$ in accordance with the various embodiments.
Figure 11B:
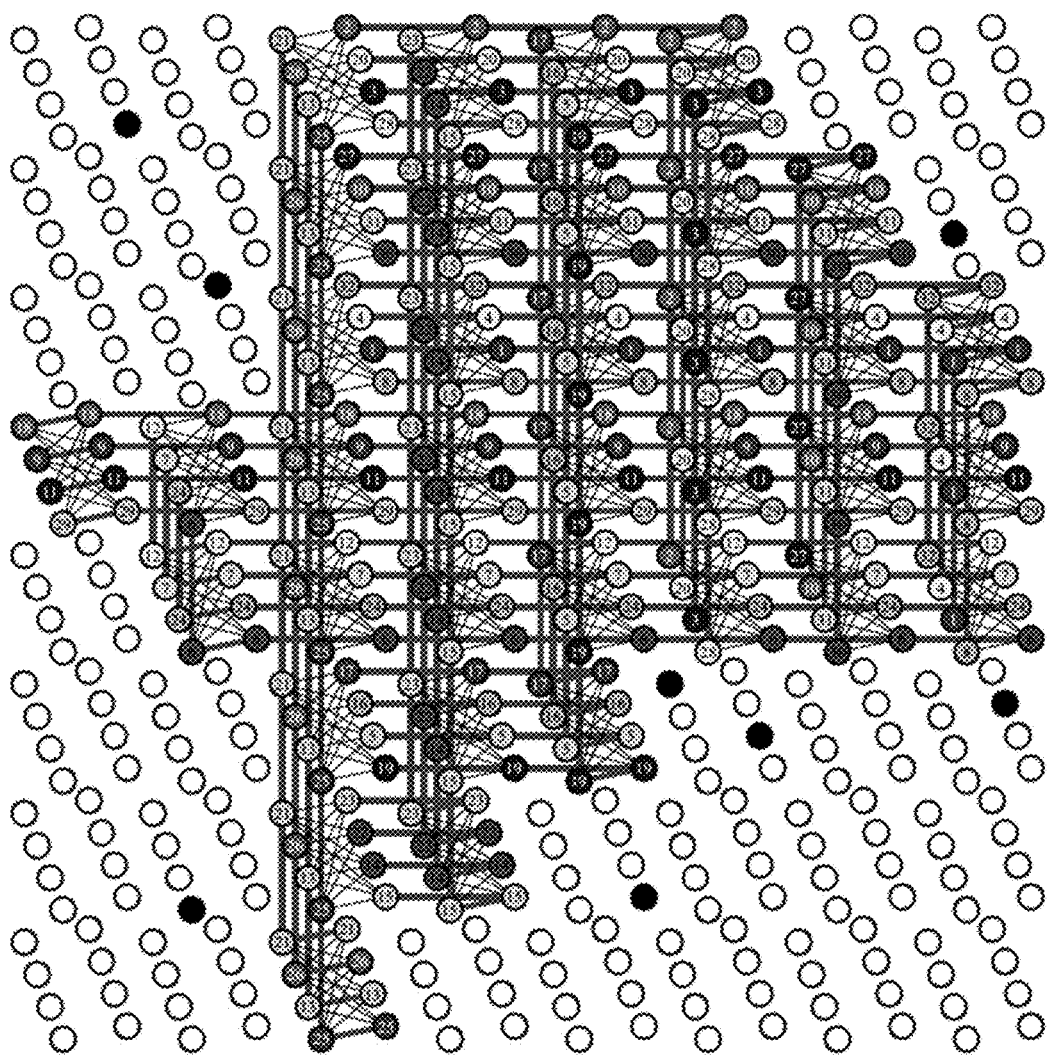

FIGS. 11A and 11B show MEs of a $K_{32}$. These were used, e.g., to minor-embed a C=8 nesting of a $K_4$, or a C=4 nesting of a $K_8$. FIG. 11A shows the Choi embedding implemented on a perfect Chimera graph. FIG. 11B shows a heuristic ME for the actual D-WAVE 2000Q device used in this work, whose Chimera graph contains 8 unusable qubits (circles). Different colors (and labels) denote chains representing minor-embedded logical qubits. Thin lines are logical couplings, while thick lines represent energy penalties (ferromagnetic couplings).

The Choi technique requires a perfect Chimera graph, without missing vertices. In actual devices, however, imperfections in fabrication or the calibration process lead to the presence of unusable qubits (e.g., due to trapped flux). These qubits, along with their couplings are then permanently disabled and cannot be used in the QA process. Efficient heuristic algorithms have been developed to search for MEs for the resulting induced Chimera subgraphs. FIG. 11B shows the ME of a K32 obtained when a heuristic algorithm is applied to the actual hardware graph of the D-WAVE 2000Q "Vesuvius" chip installed at USC-ISI. Note how the ME avoids the unusable qubits, depicted as black circles in FIG. 11B.

The MEs shown in FIGS. 11A and 11B are the actual "Choi" and "heuristic" MEs used in the experiments and simulations. As discussed above, SQA simulations demonstrate that the choice of the ME has a significant impact on the performance of NQAC. In particular, it turns out that the Choi ME outperforms the heuristic ME.

V. Additional Experimental Data

Here is presented additional experimental data for $K_N$'s with couplings randomly generated from the set $J_{ij} \in \{0.1, 0.2, \ldots, 0.9, 1\}$. For large N, $K_N$ generated in this manner have a finite temperature spin glass phase transition. This property renders simulated annealing inefficient in finding the ground state of such problems. The previously discussed results report data for a random $K_8$ instance that is referred to here as "harder-$K_8$":

$$K_8^h = \begin{pmatrix} 0 & 0.4 & 0.7 & 0.5 & 0.3 & 0.5 & 0.2 & 0.5 \\ 0 & 0 & 0.3 & 0.8 & 0.8 & 0.3 & 0.5 & 0.7 \\ 0 & 0 & 0 & 0.5 & 0.9 & 0.9 & 0.3 & 0.9 \\ 0 & 0 & 0 & 0 & 1 & 0.8 & 0.8 & 0.7 \\ 0 & 0 & 0 & 0 & 0 & 0.9 & 0.3 & 0.6 \\ 0 & 0 & 0 & 0 & 0 & 0 & 0.9 & 0.4 \\ 0 & 0 & 0 & 0 & 0 & 0 & 0 & 0.5 \\ 0 & 0 & 0 & 0 & 0 & 0 & 0 & 0 \end{pmatrix}. \quad (S.14)$$

Data was also collected for another random $K_8$ instance that turned out to have a higher success probability, so one can refer to it as "easy-$K_8$":

$$K_8^e = \begin{pmatrix} 0 & 0.8 & 0.7 & 0.8 & 0.9 & 0.4 & 0.2 & 0.9 \\ 0 & 0 & 0.7 & 0.8 & 0.3 & 0.7 & 1 & 0.3 \\ 0 & 0 & 0 & 0.7 & 0.6 & 0.1 & 0.5 & 0.6 \\ 0 & 0 & 0 & 0 & 0.1 & 0.8 & 0.1 & 0.5 \\ 0 & 0 & 0 & 0 & 0 & 0.5 & 0.8 & 0.2 \\ 0 & 0 & 0 & 0 & 0 & 0 & 0.6 & 0.7 \\ 0 & 0 & 0 & 0 & 0 & 0 & 0 & 1 \\ 0 & 0 & 0 & 0 & 0 & 0 & 0 & 0 \end{pmatrix}. \quad (S.15)$$

Figure 12A:
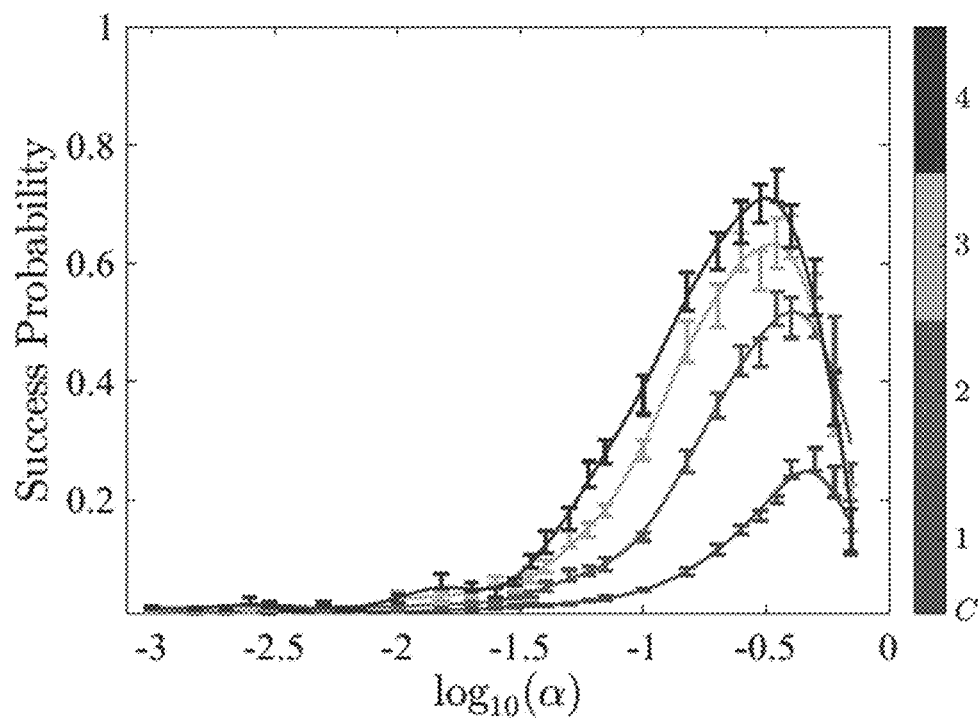
FIGS. 12A and 12B show $P_C(\alpha)$ and adjusted $P'_C(\alpha)$, for the hard-$K_8$ instance, obtained in accordance with the various embodiments with a D-Wave 2000Q quantum annealer.
Figure 12B:
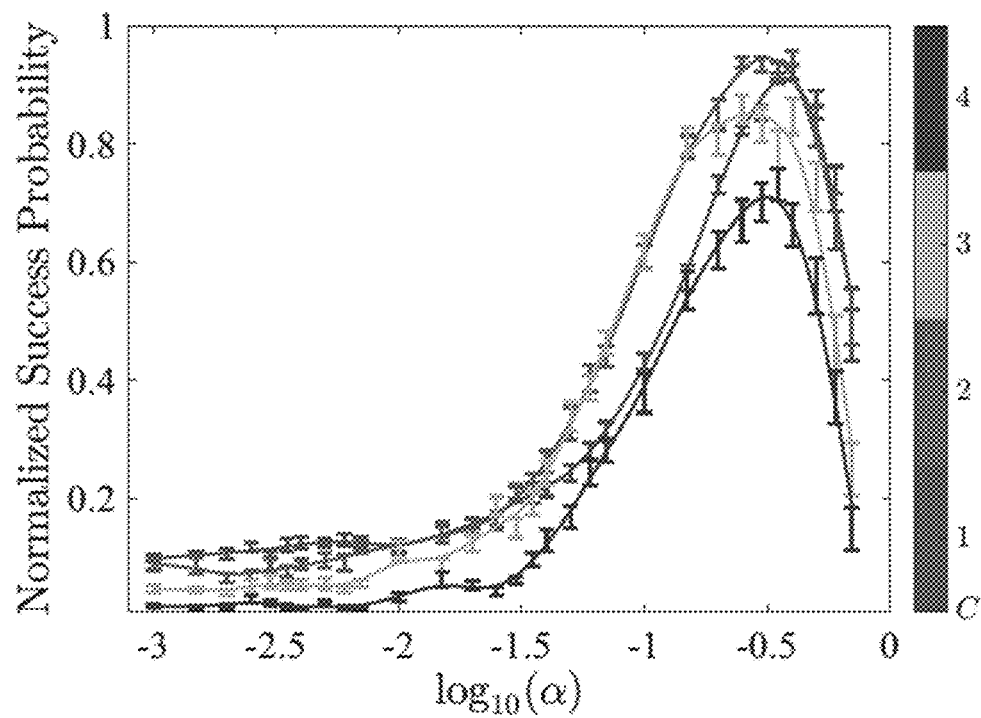
Figure 12C:
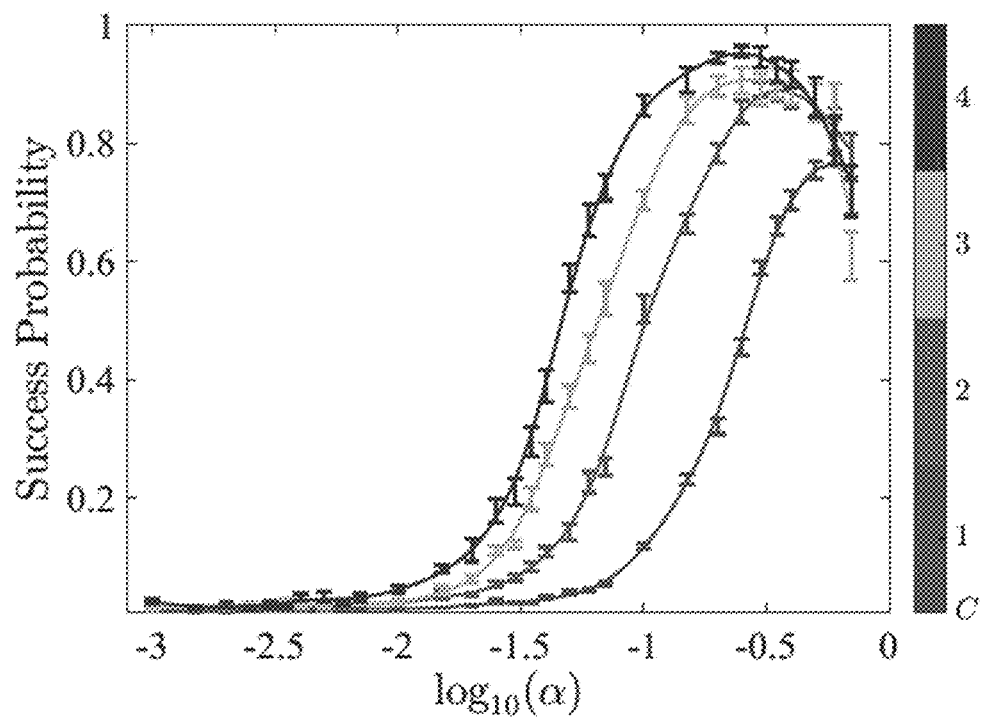
FIGS. 12C and 12D show $P_C(\alpha)$ and adjusted $P'_C(\alpha)$, for the easy-$K_8$ instance, obtained in accordance with the various embodiments with a D-Wave 2000Q quantum annealer.
Figure 12D:
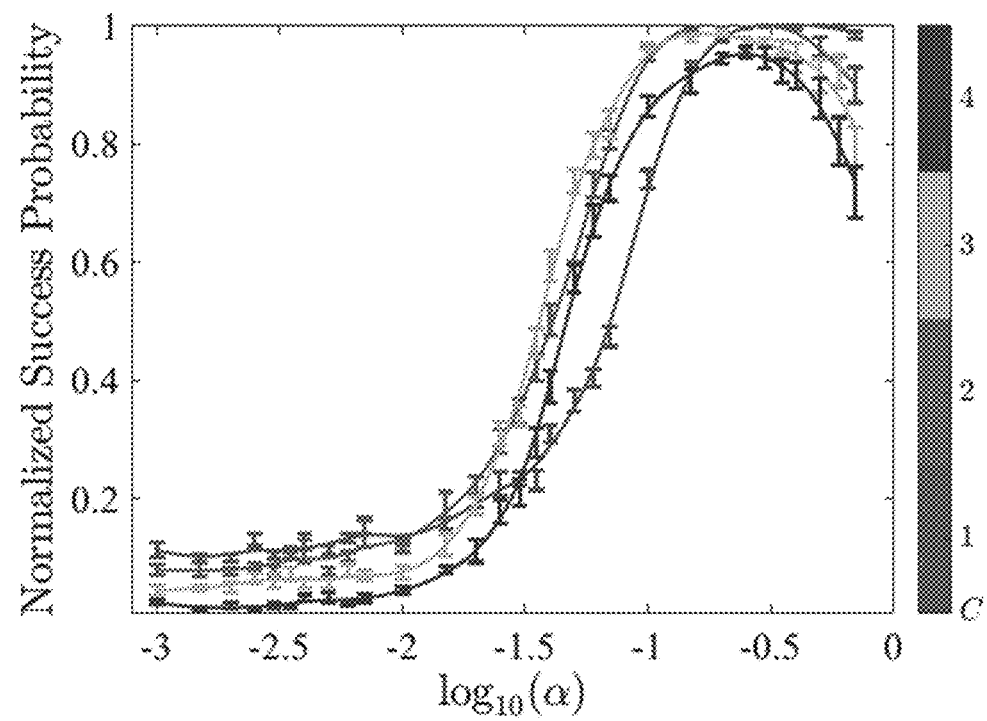

The results of these two instances are shown in FIGS. 12A-12D. In particular, FIGS. 12A and 12B show $P_C(\alpha)$ and adjusted $P_C'(\alpha)$ for the hard-$K_8$ instance. FIGS. 12C and 12D show $P_C(\alpha)$ and adjusted $P_C'(\alpha)$ for the easy-$K_8$ instance.

Data was also collected for a "easy-$K_{10}$" instance and an "hard-$K_{10}$" instance:

$$K_{10}^e = \begin{pmatrix} 0 & 0.2 & 0.7 & 0.8 & 0.5 & 0.3 & 0.8 & 0.9 & 0.4 & 0.1 \\ 0 & 0 & 0.1 & 0.1 & 0.4 & 0.7 & 0.3 & 0.3 & 0.9 & 0.1 \\ 0 & 0 & 0 & 0.3 & 0.8 & 0.7 & 0.6 & 0.9 & 0.6 & 0.6 \\ 0 & 0 & 0 & 0 & 0.8 & 0.2 & 0.7 & 0.3 & 0.6 & 0.8 \\ 0 & 0 & 0 & 0 & 0 & 0.2 & 0.9 & 1 & 1 & 1 \\ 0 & 0 & 0 & 0 & 0 & 0 & 1 & 0.4 & 0.3 & 0.2 \\ 0 & 0 & 0 & 0 & 0 & 0 & 0 & 0.2 & 0.8 & 0.6 \\ 0 & 0 & 0 & 0 & 0 & 0 & 0 & 0 & 0.8 & 0.5 \\ 0 & 0 & 0 & 0 & 0 & 0 & 0 & 0 & 0 & 0.1 \\ 0 & 0 & 0 & 0 & 0 & 0 & 0 & 0 & 0 & 0 \end{pmatrix}, \quad (S.16)$$

$$K_{10}^h = \begin{pmatrix} 0 & 0.6 & 0.9 & 0.8 & 0.5 & 1 & 0.4 & 0.2 & 0.1 & 0.5 \\ 0 & 0 & 0.8 & 0.9 & 0.1 & 0.6 & 0.2 & 0.7 & 0.7 & 0.9 \\ 0 & 0 & 0 & 0.8 & 0.6 & 0.3 & 0.8 & 0.2 & 0.6 & 0.6 \\ 0 & 0 & 0 & 0 & 0.1 & 0.3 & 0.8 & 0.4 & 0.6 & 0.5 \\ 0 & 0 & 0 & 0 & 0 & 0.7 & 0.6 & 0.4 & 0.3 & 0.1 \\ 0 & 0 & 0 & 0 & 0 & 0 & 0.1 & 1 & 0.9 & 0.6 \\ 0 & 0 & 0 & 0 & 0 & 0 & 0 & 0.9 & 0.9 & 0.9 \\ 0 & 0 & 0 & 0 & 0 & 0 & 0 & 0 & 0.1 & 1.0 \\ 0 & 0 & 0 & 0 & 0 & 0 & 0 & 0 & 0 & 0.3 \\ 0 & 0 & 0 & 0 & 0 & 0 & 0 & 0 & 0 & 0 \end{pmatrix}.$$

Figure 13A:
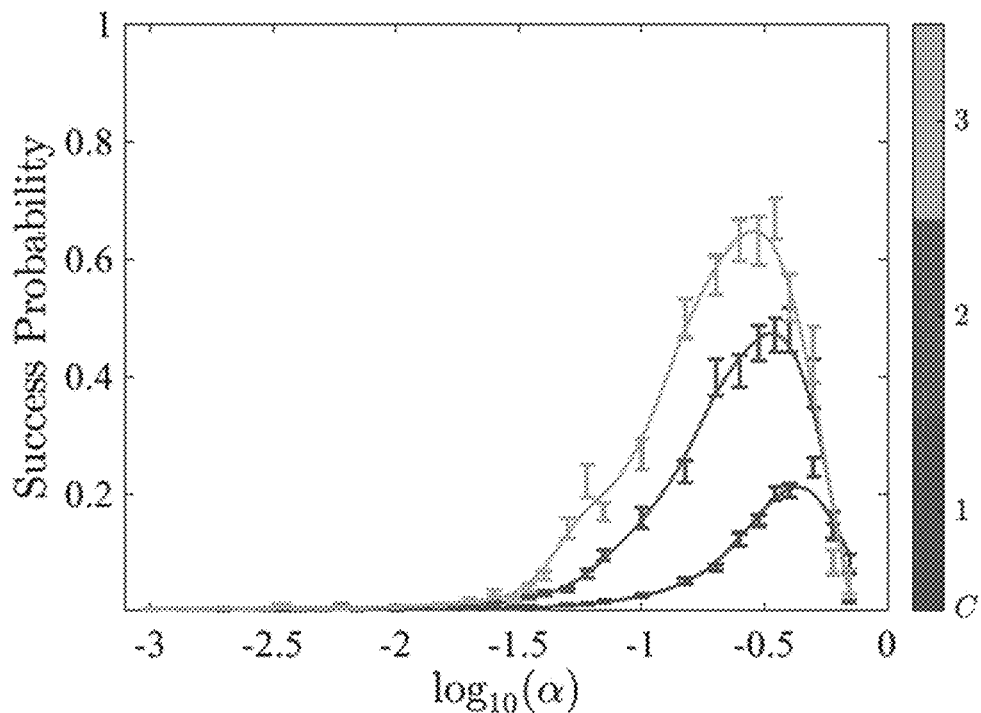
FIGS. 13A and 13B show $P_C(\alpha)$ and adjusted $P'_C(\alpha)$, for the hard-$K_{10}$ instance, obtained in accordance with the various embodiments with a D-Wave 2000Q quantum annealer.
Figure 13B:
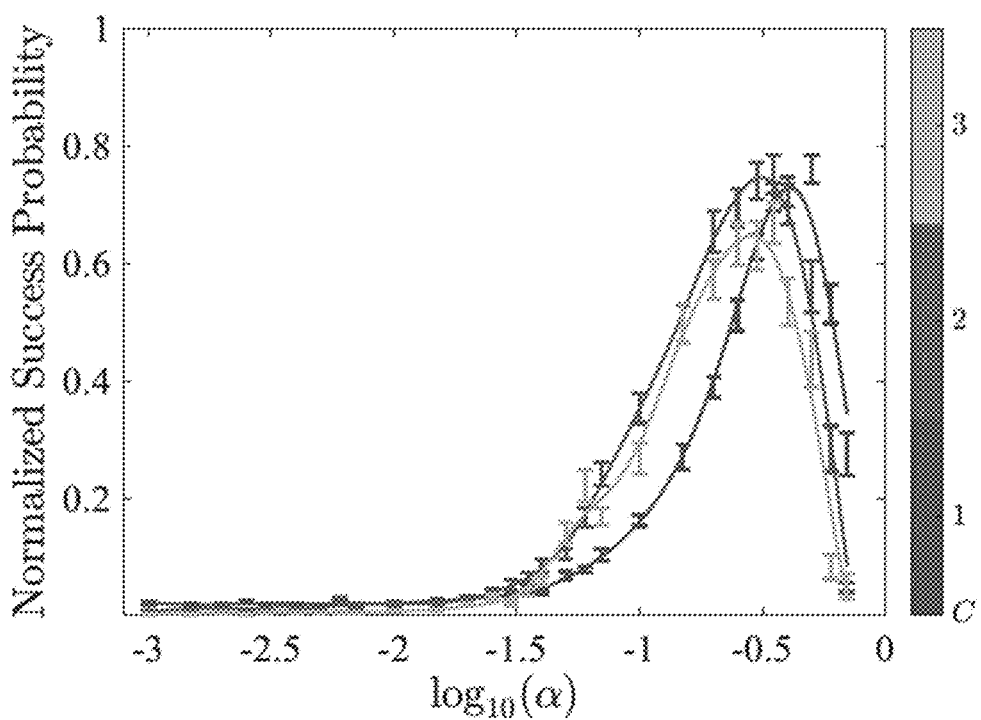
Figure 13C:
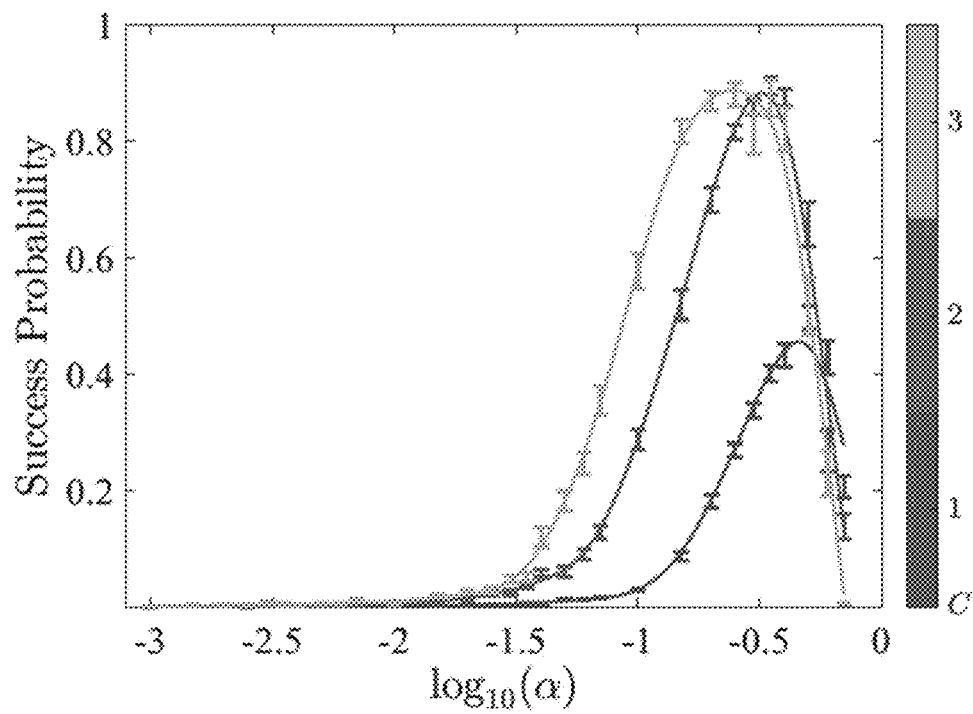
FIGS. 13C and 13D show $P_C(\alpha)$ and adjusted $P'_C(\alpha)$, for the easy-$K_{10}$ instance, obtained in accordance with the various embodiments with a D-Wave 2000Q quantum annealer.
Figure 13D:
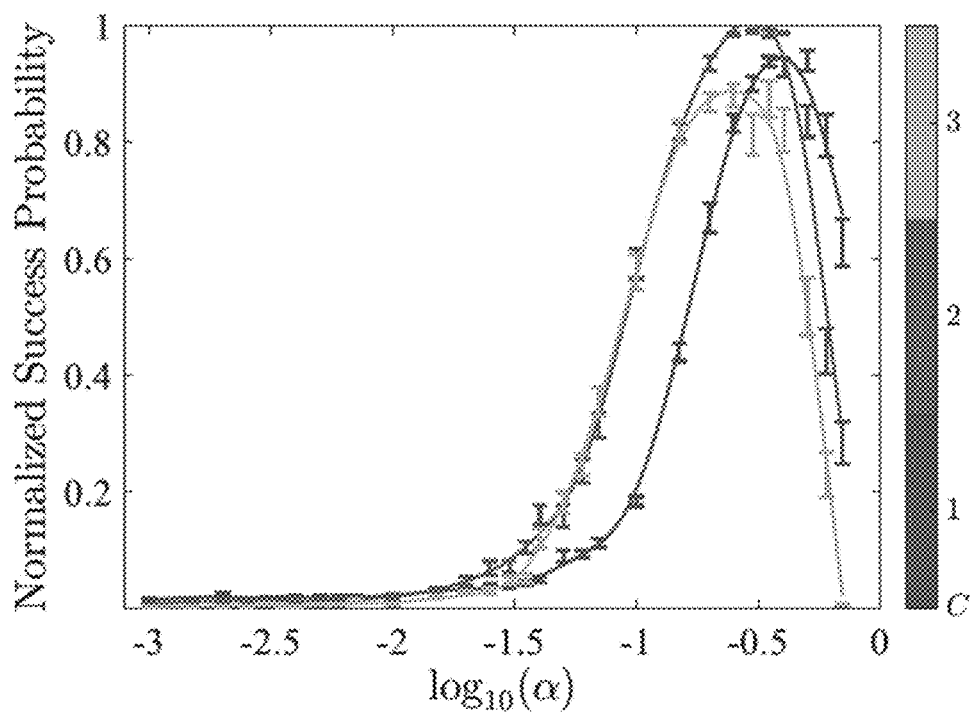

The results of these two instances are shown in FIGS. 13A-13D. In particular, FIGS. 13A and 13B show $P_C(\alpha)$ and adjusted $P_C'(\alpha)$ for the hard-$K_{10}$ instance. FIGS. 13C and 13D show $P_C(\alpha)$ and adjusted $P_C'(\alpha)$ for the easy-$K_{10}$ instance.

In all cases, results are displayed up to nesting degree C.=3.

Figure 14A:
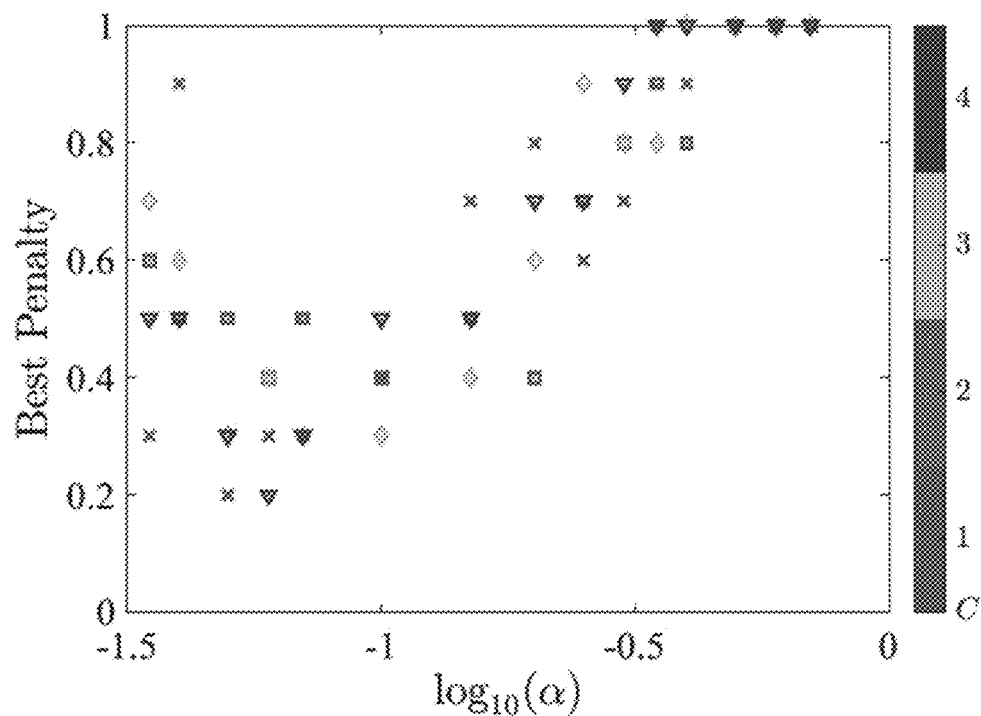
FIGS. 14A-14D shows the optimal penalty strength as a function of the energy scale for the instances considered obtained with a D-Wave 2000Q quantum annealer.
Figure 14B:
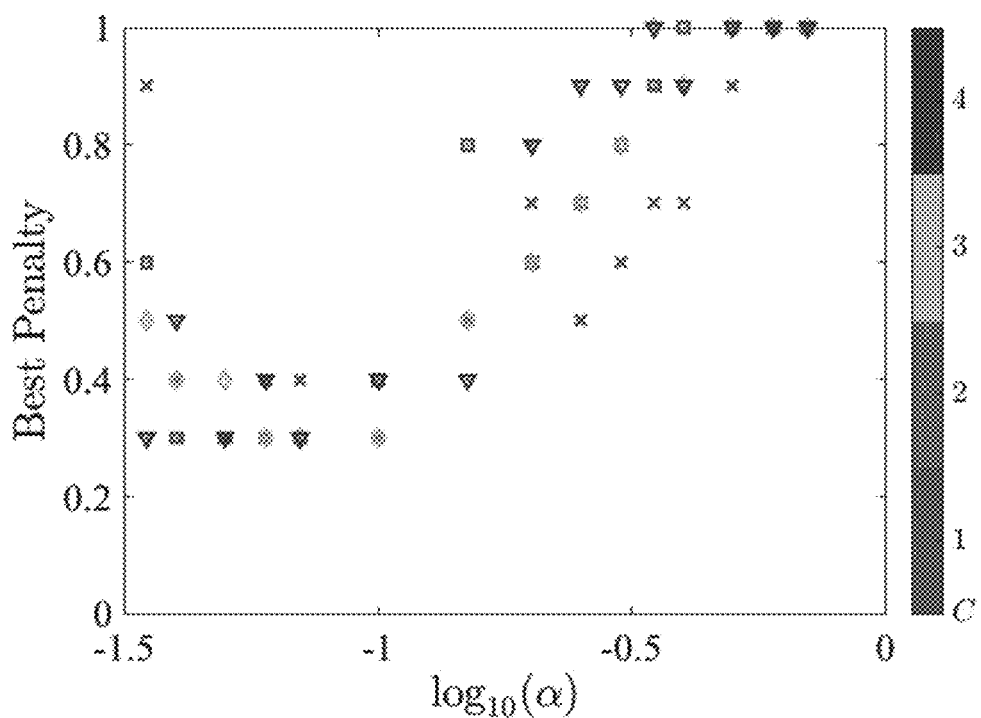
Figure 14C:
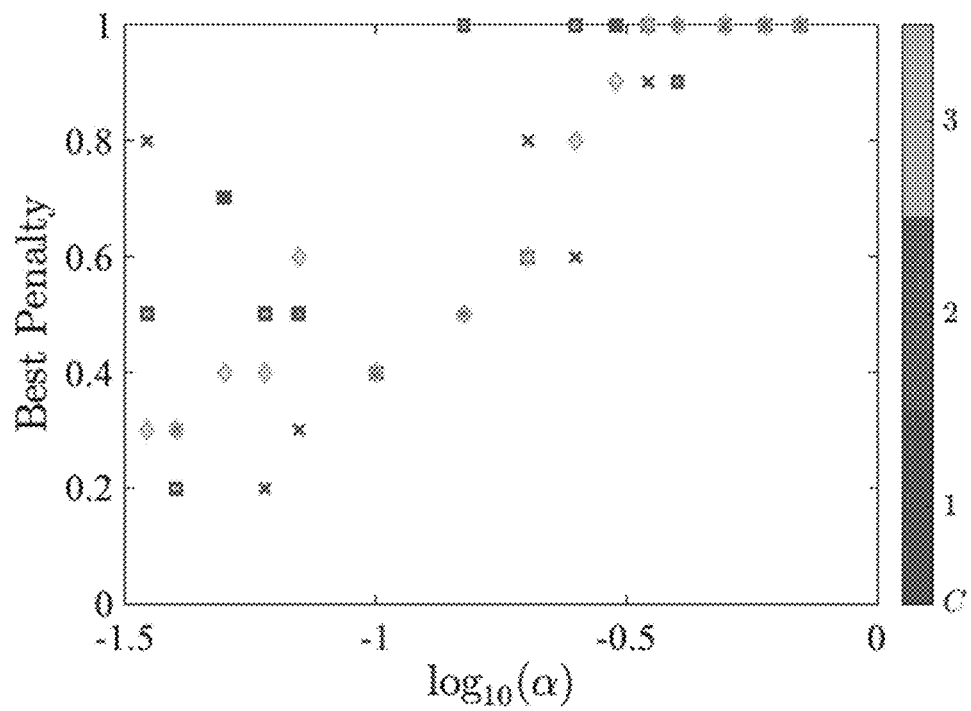
Figure 14D:
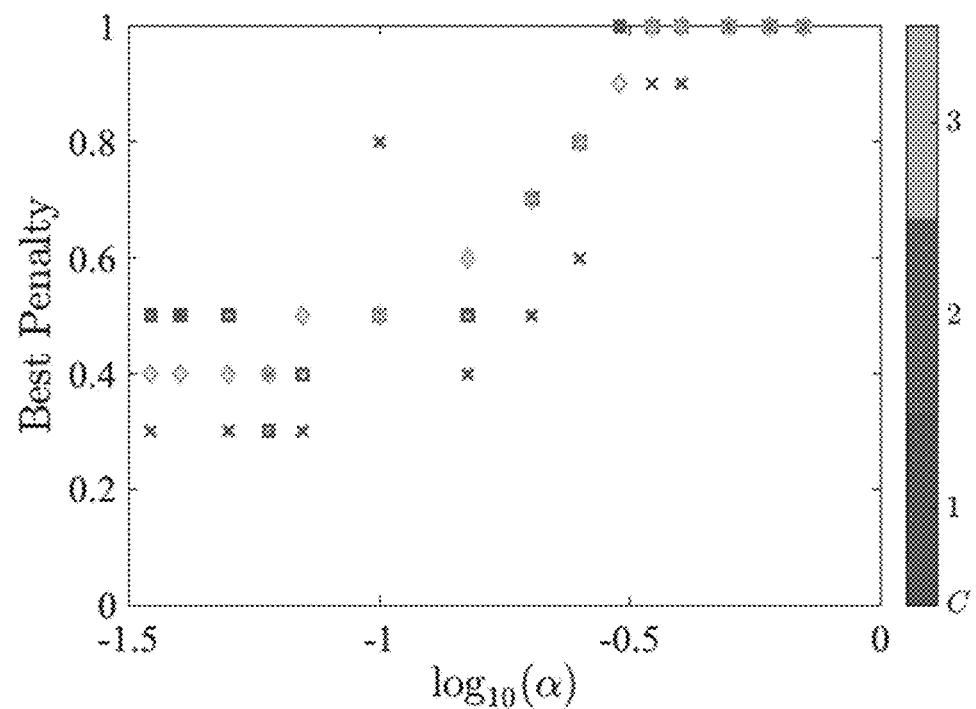

FIGS. 14A-14D shows the optimal penalty strength as a function of the energy scale for the four instances considered. In particular, FIG. 14A shows optimal penalty values (γ) for the hard-$K_8$ instance and FIG. 14B shows the values for the easy-$K_8$ instance. FIG. 14C shows values for the hard-$K_{10}$ instance and FIG. 14D shows the values for the easy-$K_{10}$ instance. A saturation of the optimal penalty is visible at the maximal possible value |γ|=1 for α close to 1, implying that the true optimal penalty values are >1 in this range.

Figure 15A:
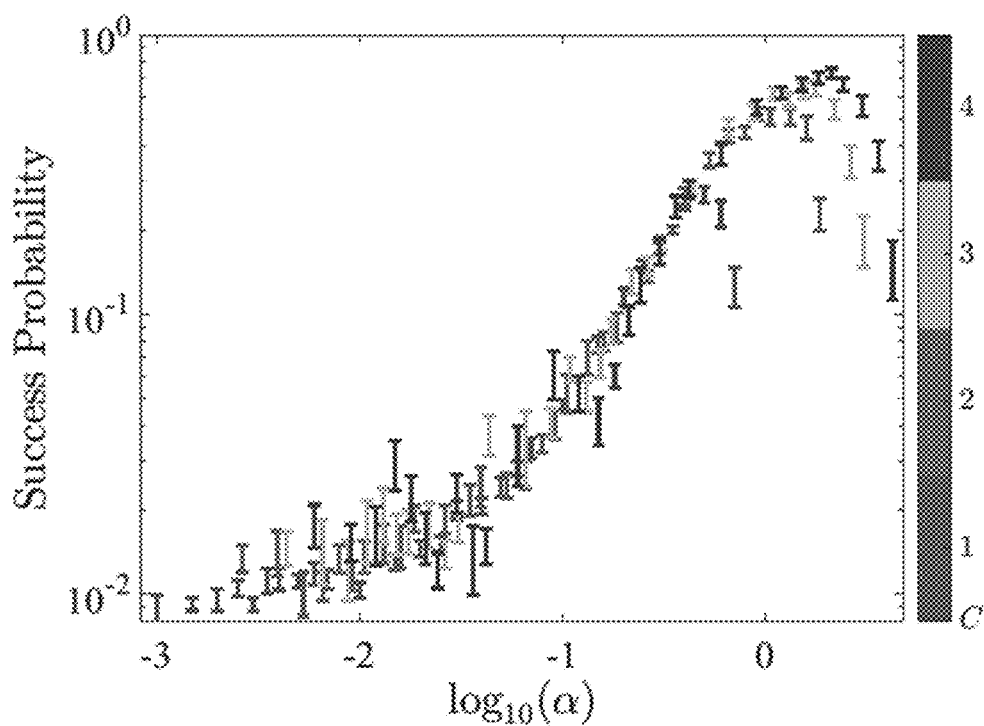
FIGS. 15A-15D show data collapse and $\mu_C$ scaling results for the antiferromagnetic hard-$K_8$ problem considered above, as well as the easy-$K_8$ problem obtained with a D-Wave 2000Q quantum annealer.
Figure 15B:
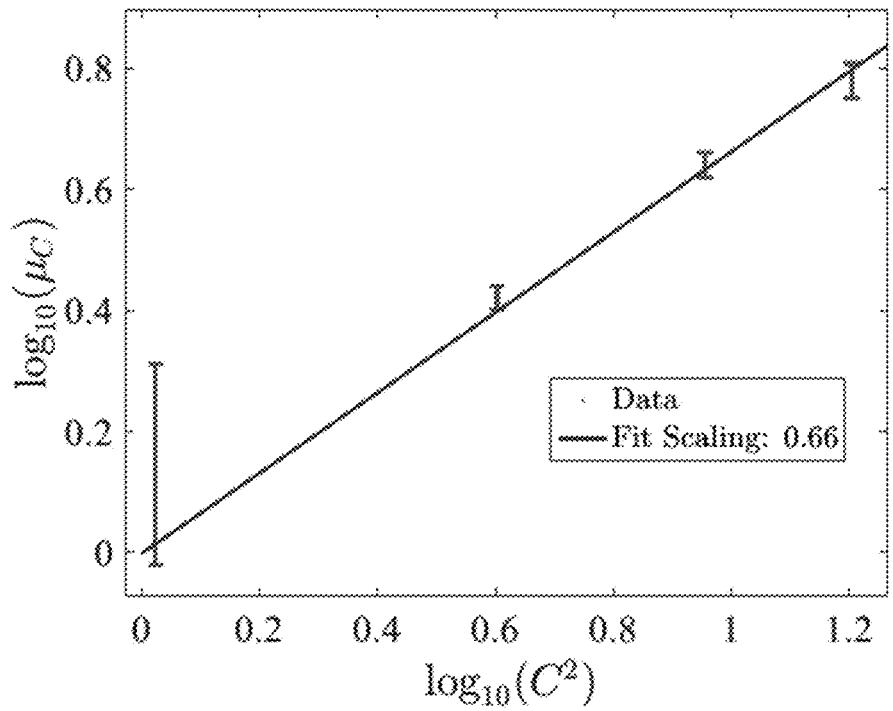
Figure 15C:
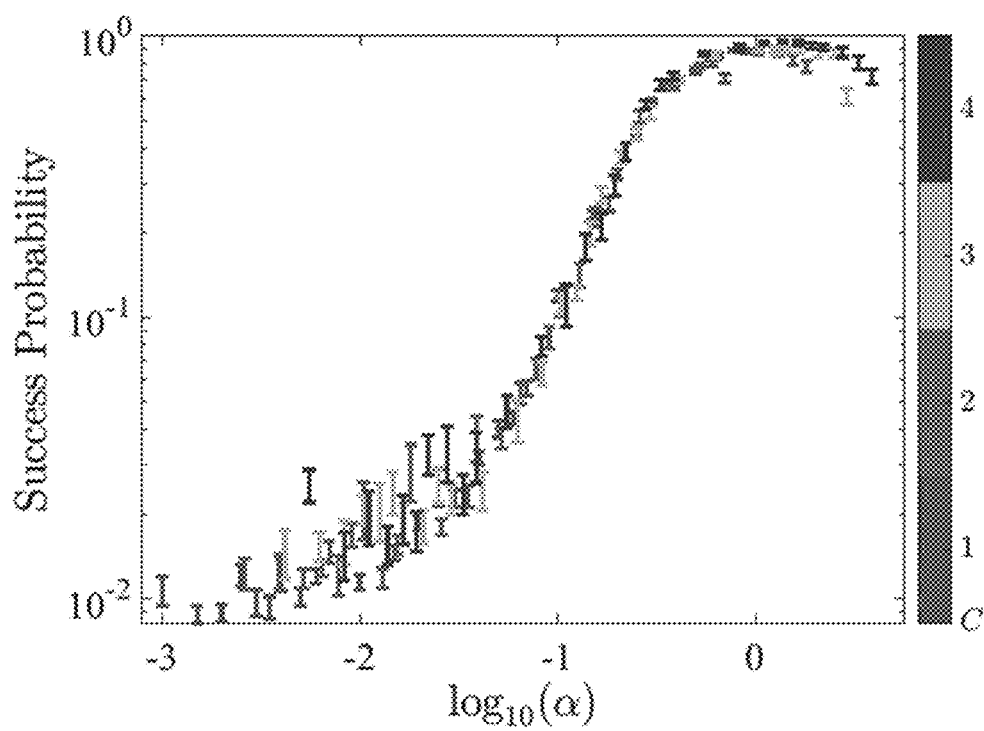
Figure 15D:
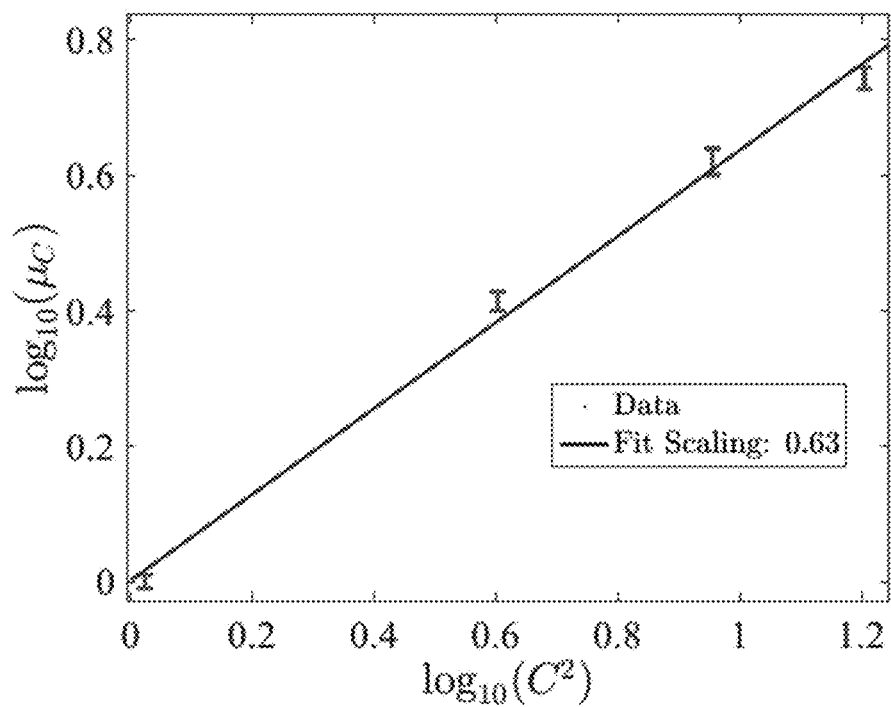

FIGS. 15A-15D show data collapse and $\mu_C$ scaling results for the antiferromagnetic hard-$K_8$ problem considered above, as well as the easy-$K_8$ problem. In particular, FIGS. 15A and 15B, respectively, show data collapse and $\mu_C$ scaling results for the hard-$K_8$ problem. FIGS. 15C and 15D, respectively, show data collapse and $\mu_C$ scaling results for the easy-$K_8$ problem. As shown in FIGS. 15A and 1C, there is a data collapse to the left of the peak. Recall that the peak is due to having reached the maximum penalty value, as illustrated in FIGS. 14A-14D. The associated scaling of the energy boost $\mu_C$, as shown in FIGS. 15B and 15D, yields $\mu_C \sim C^{1.32}$ for the hard-$K_8$ instance and $\mu_C \sim C^{1.26}$ for the easy-$K_8$ instance.

Figure 16A:
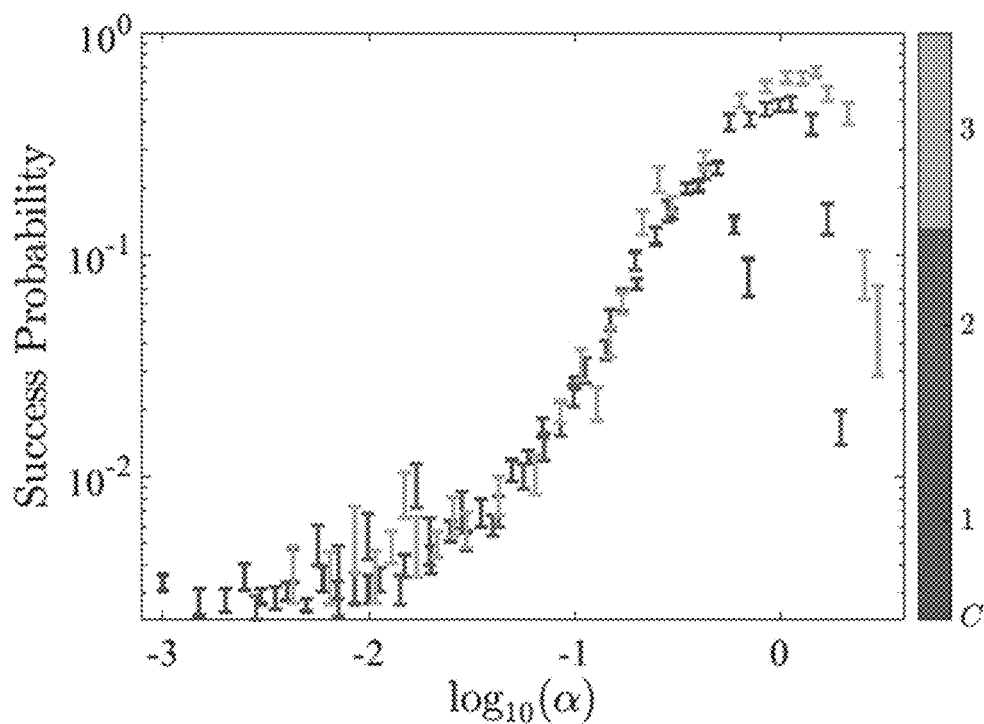
FIGS. 16A-16D show data collapse and $\mu_C$ scaling results for the antiferromagnetic hard-$K_{10}$ problem considered above, as well as the easy-$K_{10}$ problem obtained with a D-Wave 2000Q quantum annealer.
Figure 16B:
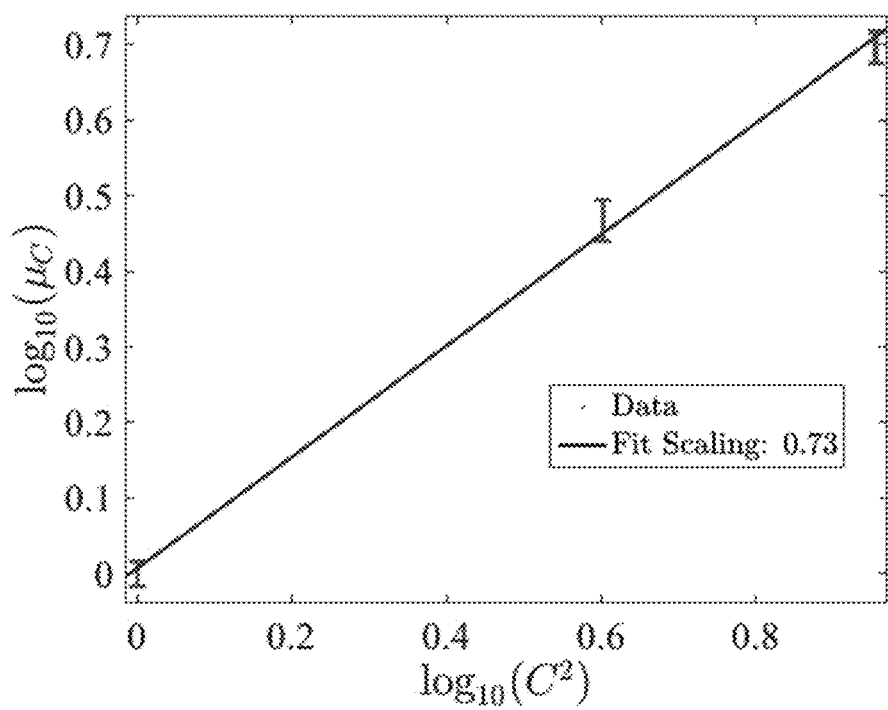
Figure 16C:
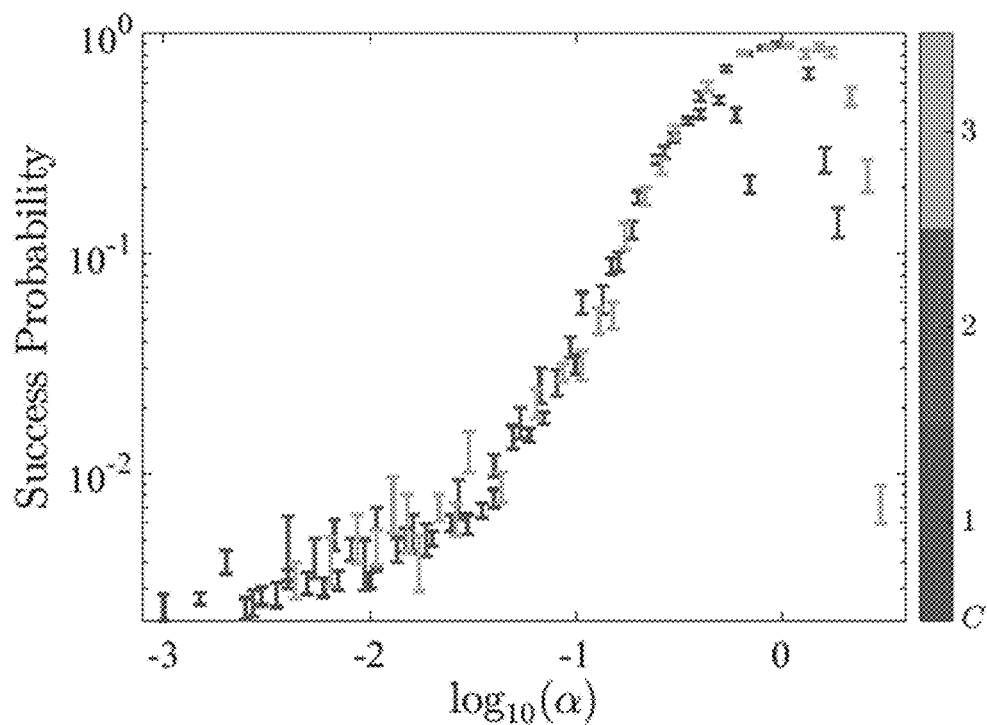
Figure 16D:
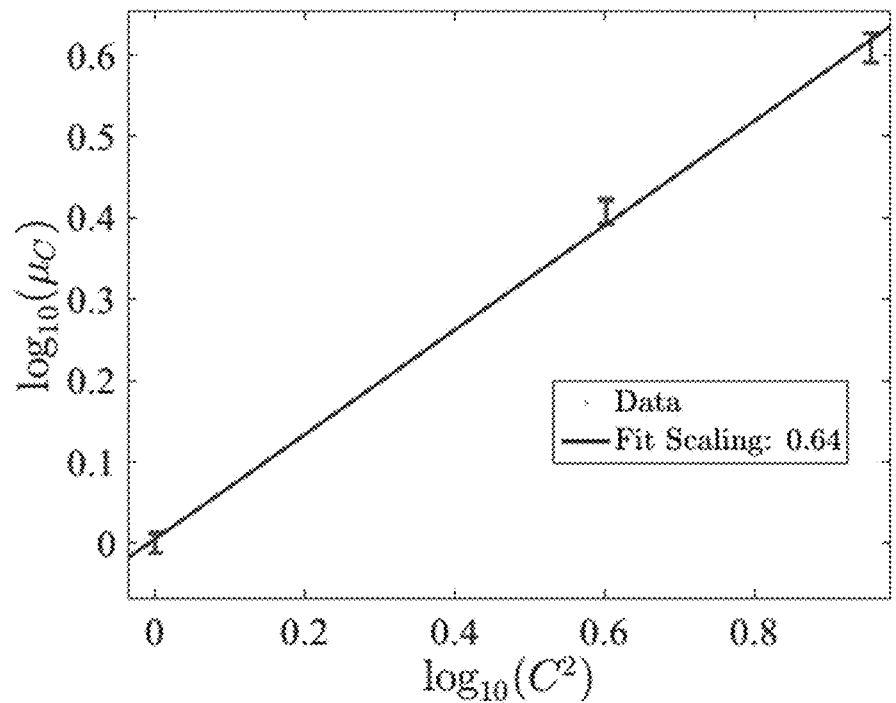

FIGS. 16A-16D show data collapse and $\mu_C$ scaling results for the antiferromagnetic hard-$K_{10}$ problem considered above, as well as the easy-$K_{10}$ problem. In particular, FIGS. 16A and 16B, respectively, show data collapse and $\mu_C$ scaling results for the hard-$K_{10}$ problem. FIGS. 16C and 16D, respectively, show data collapse and $\mu_C$ scaling results for the easy-$K_{10}$ problem. For both of these instances, $\mu_C \sim C^{1.34}$.

VI. Determination of $\mu_C$

To determine the values of $\mu_C$ and estimate error bars, one proceeds as follows. First, one can use smoothing splines to determine a continuous interpolation $P_C^{mid}(\alpha)$ of the discrete data points $P_C(\alpha)$. In the same way one can also determine the higher and lower interpolating curves $P_C^{high}(\alpha)$ and $P_C^{low}(\alpha)$ for the data points $P_C(\alpha)+\delta P_C(\alpha)$ and $P_C(\alpha)-\delta P_C(\alpha)$ respectively, where $\delta P_C(\alpha)$ denotes the standard error of $P_C(\alpha)$. A reference value $\alpha_C^{mid}$ was then determined such that $P_C^{mid}(\alpha_C^{mid})=P_0$, where a smooth interpolation of the experimental data is used. The energy boost was then determined as $\mu_C=\alpha_1^{mid}/\alpha_C^{mid}$. $P_0$ is an arbitrarily chosen reference value where the different $P_C(\alpha)$ curves are overlapped. This reference serves as a base point for computing $\mu_C$. As shown in the main text for the $K_4$, the overlap of the $P_C$ data over the entire $\alpha$ range means that the specific choice of $P_0$ is arbitrary.

One can similarly determine $\mu_C^{high}=\alpha_1^{high}/\alpha_C^{high}$ and $\mu_C^{low}=\alpha_1^{low}/\alpha_C^{low}$ using the corresponding interpolating curves. The error bars shown in the figures were then centered at $\mu_C$, with lower and upper error bars being $\mu_C^{high}$ and $\mu_C^{low}$, respectively.

VII. Numerical Methods

Previously, results were reported based on quantum Monte Carlo techniques described above. Here this technique is briefly reviewed. Simulated Quantum Annealing (SQA) is a quantum Monte Carlo based algorithm whereby Monte Carlo dynamics are used to sample from the instantaneous Gibbs state associated with the Hamiltonian H(t) of the system. The state at the end of the quantum Monte Carlo simulation of the quantum Hamiltonian H(t) is used as the initial state for the next Monte Carlo simulation with Hamiltonian H(t+Δt). This is repeated until H(t$_f$) is reached. SQA was originally proposed as an optimization algorithm [13, 14], but it has since gained traction as a computationally efficient classical description for T>0 quantum annealers. An important caveat is that SQA does not capture the unitary dynamics of the quantum system, but it is hoped that the sampling of the instantaneous Gibbs state captures thermal processes in the quantum annealer, which may be the dominant dynamics if the evolution is sufficiently slow. Although there is strong evidence that SQA does not completely capture the final-time output of the D-Wave processors, at present it is the only viable means to simulate large (>15 qubits) open QA systems. Discrete-time quantum Monte Carlo was used in these simulations with the number of Trotter slices fixed to 64. Spin updates were performed via Wolff-cluster updates along the Trotter direction only.

What is claimed is:

1. A method of processing, with error suppression, using a quantum processor, the method comprising:
   obtaining a problem Hamiltonian having a first plurality of logical qubits represented by a logical graph $K_N$, each logical qubit of the first plurality of logical qubits being coupled to another logical qubit of the first plurality of logical qubits;
   defining a nested Hamiltonian with a second plurality of logical qubits larger than the first plurality of logical qubits by embedding the logical graph $K_N$ into a larger logical graph $K_{C\times N}$, where N represents a number of logical qubits in the second plurality of logical qubits, and where C represents a nesting level defining the amount of hardware resources for the nested Hamiltonian, each logical qubit i (i=1, . . . , N) of the first plurality of logical qubits in the logical graph $K_N$ being represented by a corresponding C-tuple of logical qubits (i, c) (c=1, . . . , C) of the second plurality of logical qubits in the logical graph $K_{C\times N}$, each coupling between logical qubits of the first plurality of logical qubits being represented by $C^2$ couplings between the corresponding C-tuples of logical qubits of the second plurality of logical qubits to thereby provide an effective temperature reduction for the problem Hamiltonian during a quantum annealing process of the nested Hamiltonian;
   encoding the nested Hamiltonian into a plurality of physical qubits of the quantum processor;
   performing the quantum annealing process with the quantum processor after the encoding, where the effective temperature reduction reduces thermal errors during the quantum annealing process;
   further comprising: measuring the plurality of physical qubits; and recovering a logical state of each of the plurality qubits using a decoding procedure;
   wherein the encoding further comprises performing a minor embedding process comprising implementing each of the second plurality of logical qubits in the nested Hamiltonian as a ferromagnetically coupled chain having a length of L qubits of the plurality of physical qubits, such that all couplings in the nested Hamiltonian are represented by inter-chain couplings; and
   wherein the decoding procedure is performed over both (i) the length (L) chain of each encoded qubit of the second plurality of qubits and (ii) C encoded qubits comprising each C-tuple of the second plurality of logical qubits.

2. The method of claim 1, wherein a number of physical qubits necessary for the minor embedding of the $K_{C\times N}$ is $K_{C,phys}=CNL\sim C^2N^2$.

3. The method of claim 1, wherein the hardware resources comprise at least one of physical qubits, couplers, and local fields.

4. The method of claim 1, wherein the hardware resources comprise nested couplers $\tilde{J}_{(i,c),(j,c')}$ and local fields $\tilde{h}_{(i,c)}$ where $$\tilde{J}_{(i,c),(j,c')}=J_{ij}\forall c,c',i\neq j,$$

$$\tilde{h}_{(i,c)}=Ch_i,\forall c,i,$$

$$\tilde{J}_{(i,c),(i,c')}=-\gamma,\forall c\neq c'.$$

5. A quantum processing system with error suppression, comprising:
   a digital computer comprising a digital processor and a memory having stored thereon instructions for causing the digital processor to:
   obtain a problem Hamiltonian having a first plurality of logical qubits represented by a logical graph $K_N$, each logical qubit of the first plurality of logical qubits being coupled to another logical qubit of the first plurality of logical qubits;
   define a nested Hamiltonian with a second plurality of logical qubits larger than the first plurality of logical qubits by embedding the logical graph $K_N$ into a larger logical graph $K_{C\times N}$, where N represents a number of logical qubits in the second plurality of logical qubits, and where C represents a nesting level defining the amount of hardware resources for the nested Hamiltonian, each logical qubit i (i=1, . . . , N) of the first plurality of logical qubits in the logical graph $K_N$ being represented by a corresponding C-tuple of logical qubits (i, c) (c=1, . . . , C) of the second plurality of logical qubits in the logical graph $K_{C\times N}$, each coupling between logical qubits of the first plurality of logical qubits being represented by $C^2$ couplings between the corresponding C-tuples of logical qubits of the second plurality of logical qubits to thereby provide an effective temperature reduction for the problem Hamiltonian during a quantum annealing process of the nested Hamiltonian;

an analog computer coupled to the digital computer, the analog computer comprising a quantum processor and configured for:

encoding the nested Hamiltonian into a plurality of physical qubits of the quantum processor, and performing the quantum annealing process with the quantum processor after the encoding, where the effective temperature reduction reduces thermal errors during the quantum annealing process;

wherein the analog computer is configured for measuring the plurality of physical qubits, and wherein the instructions further comprise instructions for causing the digital processor to recover a logical state of each of the plurality qubits using a decoding procedure;

wherein the encoding further comprises performing a minor embedding process comprising implementing each of the second plurality of logical qubits in the nested Hamiltonian as a ferromagnetically coupled chain having a length of L qubits of the plurality of physical qubits, such that all couplings in the nested Hamiltonian are represented by inter-chain couplings; and wherein the decoding procedure is performed over both (i) the length (L) chain of each encoded qubit of the second plurality of qubits and (ii) C encoded qubits comprising each C-tuple of the second plurality of logical qubits.

6. The method of claim 5, wherein a number of physical qubits necessary for the minor embedding of the $K_{C \times N}$ is $K_{C,phys} = CNL \sim C^2 N^2$.

7. The system of claim 5, wherein the hardware resources comprise at least one of physical qubits, couplers, and local fields.

8. The system of claim 5, wherein the hardware resources comprise nested couplers $\tilde{J}_{(i,c),(j,c')}$ and local fields $\tilde{h}_{(i,c)}$ where $$\tilde{J}_{(i,c),(j,c')} = J_{ij}, \forall c,c', i \neq j,$$

$$\tilde{h}_{(i,c)} = Ch_i, \forall c,i,$$

$$\tilde{J}_{(i,c),(i,c')} = -\gamma, \forall c \neq c'.$$

* * * * *